United States Patent
Park et al.

(10) Patent No.: US 12,356,428 B2
(45) Date of Patent: *Jul. 8, 2025

(54) METHOD AND APPARATUS FOR GRANT-FREE DATA TRANSMISSION IN WIRELESS COMMUNICATION SYSTEM

(71) Applicant: Samsung Electronics Co., Ltd., Suwon-si (KR)

(72) Inventors: Sungjin Park, Suwon-si (KR); Youngbum Kim, Suwon-si (KR); Hyunseok Ryu, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,177

(22) Filed: Apr. 8, 2024

(65) Prior Publication Data

US 2024/0260048 A1 Aug. 1, 2024

Related U.S. Application Data

(63) Continuation of application No. 17/505,054, filed on Oct. 19, 2021, now Pat. No. 11,956,798.

(30) Foreign Application Priority Data

Oct. 19, 2020 (KR) ......................... 10-2020-0135145
Sep. 28, 2021 (KR) ......................... 10-2021-0127967

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04L 1/1887* (2013.01); *H04W 72/121* (2013.01)

(58) Field of Classification Search
CPC .. H04B 7/0695; H04W 72/046; H04W 72/30; H04W 76/27; H04W 72/23;
(Continued)

(56) References Cited

U.S. PATENT DOCUMENTS 8,615,248 B2 * 12/2013 Cheng ................... H04W 72/04
455/450
9,913,261 B2 * 3/2018 Lee ......................... H04J 11/00
(Continued)

FOREIGN PATENT DOCUMENTS

KR    10-2021-0093706 A    7/2021
WO       2020/068973 A1    4/2020
(Continued)

OTHER PUBLICATIONS

European Search Report dated Feb. 20, 2024, issued in European Application No. 21883180.8.
International Search Report and Written Opinion dated Jan. 25, 2022, issued in International Patent Application No. PCT/KR2021/014551.

*Primary Examiner* — Jung Liu
(74) *Attorney, Agent, or Firm* — Jefferson IP Law, LLP

(57) ABSTRACT

The disclosure relates to a communication technique that converges a 5$^{th}$ generation (5G) communication system for supporting a higher data rate after a 4$^{th}$ generation (4G) system with Internet of things (IoT) technology, and a system thereof. The disclosure can be applied to intelligent services (e.g., smart home, smart building, smart city, smart or connected car, healthcare, digital education, retail, security and safety related services, etc.) based on 5G communication technology and IoT-related technology. A method and apparatus for performing unauthorized-based commu- (Continued)

nication and hybrid automatic repeat request acknowledgement (HARQ-ACK) information transmission therefor are provided.

16 Claims, 21 Drawing Sheets

(51) Int. Cl.
  *H04L 1/1867* (2023.01)
  *H04W 72/121* (2023.01)
(58) Field of Classification Search
  CPC .. H04W 72/535; H04W 72/20; H04L 1/1825; H04L 5/0025; H04L 1/1896; H04L 5/0094; H04L 1/1614; H04L 5/0055; H04L 5/0053; H04L 5/0035; H04L 27/2613; H04L 5/005; H04L 5/0051; Y02D 30/70
  See application file for complete search history.

(56) References Cited

U.S. PATENT DOCUMENTS

| | | | | |
|---|---|---|---|---|
| 10,420,081 | B2* | 9/2019 | Novak | H04W 72/20 |
| 10,602,499 | B2* | 3/2020 | Lee | H04W 72/23 |
| 11,284,377 | B2* | 3/2022 | Novak | H04W 72/21 |
| 2018/0227104 | A1* | 8/2018 | Han | H04L 5/0053 |
| 2020/0015216 | A1* | 1/2020 | Novak | H04W 72/21 |
| 2020/0106566 | A1 | 4/2020 | Yeo et al. | |
| 2020/0106568 | A1* | 4/2020 | Tsai | H04L 1/1854 |
| 2021/0227570 | A1 | 7/2021 | Park et al. | |
| 2021/0243782 | A1* | 8/2021 | Miao | H04L 5/0091 |
| 2021/0282114 | A1* | 9/2021 | Liu | H04L 1/1614 |

FOREIGN PATENT DOCUMENTS

| | | |
|---|---|---|
| WO | 2020/139050 A1 | 7/2020 |
| WO | 2020/197195 A1 | 10/2020 |
| WO | 2020/204491 A1 | 10/2020 |

* cited by examiner

METHOD AND APPARATUS FOR GRANT-FREE DATA TRANSMISSION IN WIRELESS COMMUNICATION SYSTEM

CROSS-REFERENCE TO RELATED APPLICATION(S)

This application is a continuation application of prior application Ser. No. 17/505,054, filed on Oct. 19, 2021, which has issued as U.S. Pat. No. 11,956,798 on Apr. 9, 2024 and is based on and claims priority under 35 U.S.C. § 119(a) of a Korean patent application number 10-2020-0135145, filed on Oct. 19, 2020, in the Korean Intellectual Property Office, and of a Korean patent application number 10-2021-0127967, filed on Sep. 28, 2021, in the Korean Intellectual Property Office, the disclosure of each of which is incorporated by reference herein in its entirety.

BACKGROUND

1. Field

The disclosure relates to a method for grant-free data transmission in a wireless communication system. More particularly, the disclosure relates to a downlink grant-free data transmission method.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" communication system or a "Post long term evolution (LTE)" system.

The 5G communication system is considered to be implemented in higher frequency (mm Wave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

5G communication systems have been evolving to provide various services and, in line with providing various services, a scheme for efficiently providing such services is requested. Accordingly, there has been extensive research regarding grant-free communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect the disclosure is to provide an embodiment for performing grant-free data transmission/reception while efficiently using radio resources. Particularly, a downlink grant-free data transmission/reception method, an uplink grant-free data transmission/reception method, and a method and an apparatus for transmitting a hybrid automatic repeat request acknowledgement (HARQ-ACK) regarding the same will be described.

According to disclosed embodiments, radio resources may be used efficiently, and various services may be efficiently provided to a user according to a priority.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, configuration information on a semi-persistent scheduling (SPS) for a groupcast, in case that first downlink control information (DCI) for activating the SPS is received from the base station, receiving, from the base station, a first SPS physical downlink shared channel (PDSCH) based on the configuration information and the first DCI, identifying hybrid automatic repeat request acknowledgement (HARQ-ACK) information corresponding to the first SPS PDSCH according to a first feedback scheme, receiving, from the base station, a second SPS PDSCH, and identifying HARQ-ACK information corresponding to the second SPS PDSCH according to a second feedback scheme.

In accordance with another aspect of the disclosure, a method performed by a base station in a communication system is provided. The method includes transmitting, to a terminal, configuration information on a semi-persistent scheduling (SPS) for a groupcast, transmitting, to the terminal, first downlink control information (DCI) for activating the SPS, transmitting, to the terminal, a first SPS physical downlink shared channel (PDSCH) corresponding to the configuration information and the first DCI, identifying whether hybrid automatic repeat request acknowledgement (HARQ-ACK) information corresponding to the first SPS PDSCH is received, and in case that the HARQ-ACK information corresponding to the first SPS PDSCH is received, transmitting, to a terminal, a second SPS PDSCH.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
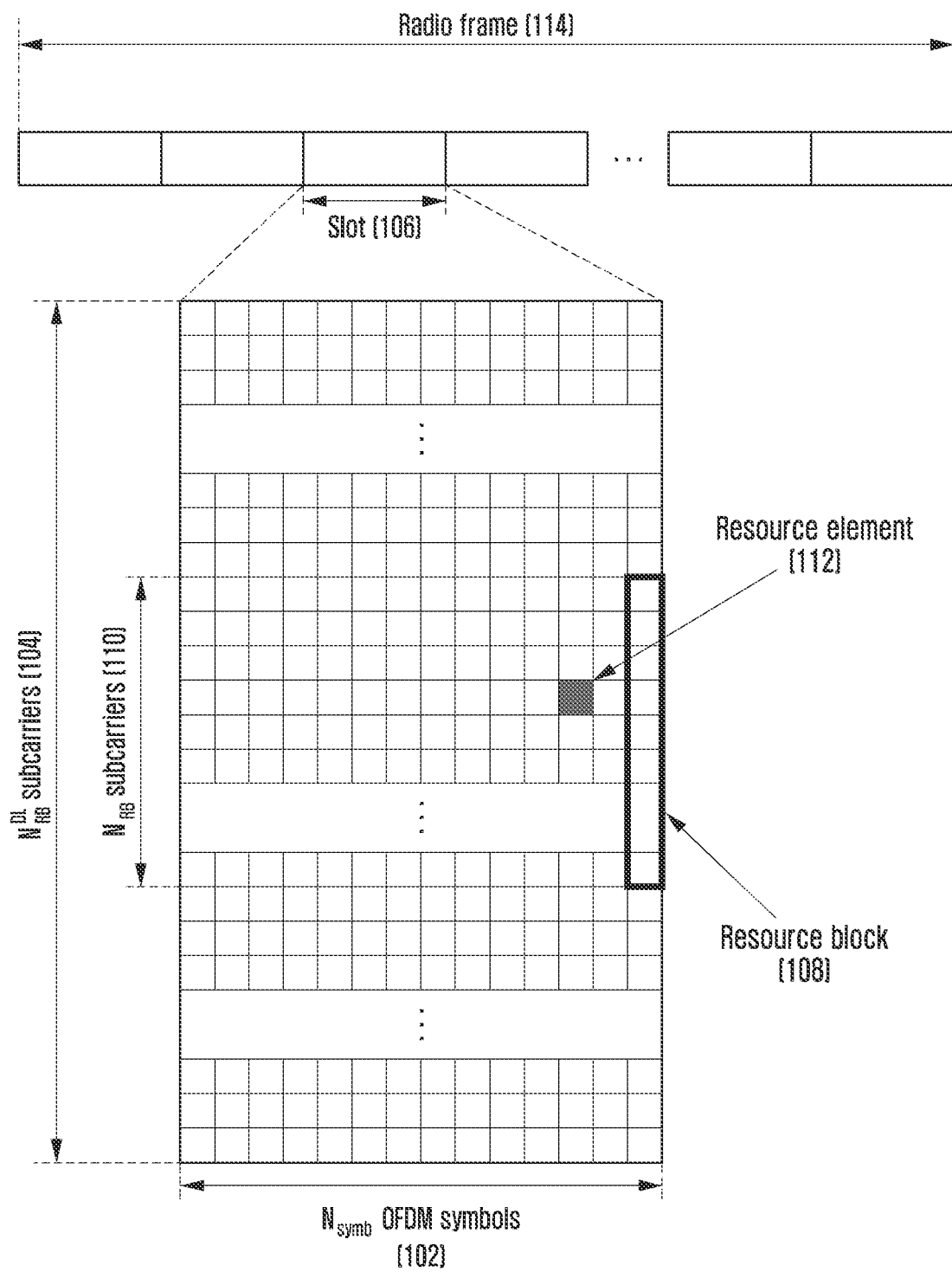
FIG. 1 is a diagram illustrating a transmission structure of a time-frequency domain, which is a radio resource region of a 5G or NR system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has evolved from a system providing a voice-oriented service to a broadband wireless communication system providing high-speed high quality packet data services of communication standards such as high speed packet access (HSPA) of 3rd generation partnership project (3GPP), long-term evolution (LTE) or evolved universal terrestrial radio access (E-UTRA), LTE-advanced (LTE-A), high rate packet data (HRPD) of 3GPP2, ultra-mobile broadband (UMB), and IEEE 802.16e. In addition, a communication standard of 5G or new radio (NR) is being made as a 5G wireless communication system.

As a representative example of the broadband wireless communication system, a 5G or NR system employs an orthogonal frequency division multiplexing (OFDM) scheme in a downlink (DL) and an uplink (UL). More specifically, a cyclic-prefix OFDM (CP-OFDM) scheme is employed in the downlink, and a discrete Fourier transform spreading OFDM (DFT-S-OFDM) scheme is employed in the uplink along with CP-OFDM. The UL refers to a radio link through which a terminal transmits data or control signals to a base station, and the DL refers to a radio link through which a base station transmits data or control signals to a terminal. The multiple access scheme, as described above, normally allocates and operates time-frequency resources including data or control information to be transmitted to each other to prevent the time-frequency resources from overlapping with each other, i.e., establish orthogonality, thereby dividing the data or the control information of each user.

The 5G or NR system employs a hybrid automatic repeat request (HARQ) method for retransmitting the corresponding data in the physical layer when a decoding failure occurs in the initial transmission. In the HARQ scheme, when the receiver fails to correctly decode (decode) data, the receiver transmits information (negative acknowledgment, NACK) notifying the transmitter of decoding failure so that the transmitter can retransmit the data in the physical layer. The receiver combines the data retransmitted by the transmitter with the previously unsuccessful data to improve data reception performance. In addition, when the receiver correctly decodes the data, the receiver may transmit information (Acknowledgement, ACK) informing the transmitter of decoding success so that the transmitter can transmit new data.

On the other hand, a new 5G communication new radio (NR) access technology system is being designed so that various services can be freely multiplexed in time and frequency resources. Accordingly, a waveform, numerology, and a reference signal may be dynamically or freely allocated according to the needs of a corresponding service. On the other hand, in the 5G or NR system, the types of supported services can be divided into categories such as enhanced mobile broadband (eMBB), massive machine type communications (mMTC), and ultra-reliable and low-latency communications (URLLC). eMBB is a high-speed transmission of high-capacity data, mMTC is a service that minimizes terminal power and connects multiple terminals, and URLLC is a service that aims for high reliability and low latency. Different requirements may be applied according to the type of service applied to the terminal.

In the disclosure, each term is a term defined in consideration of each function, which may vary according to the intention or custom of a user or an operator. Therefore, the definition should be made based on the content throughout this specification. Hereinafter, the base station, as a subject performing resource allocation of the terminal, is at least one of gNode B (gNB), eNode B (eNB), Node B, BS (Base Station), radio access unit, base station controller, or a node on the network. The terminal may include a user equipment (UE), a mobile station (MS), a cellular phone, a smart phone, a computer, or a multimedia system capable of performing a communication function. Hereinafter, an NR system will be described as an example in the disclosure, but embodiments of the disclosure are not limited thereto, and embodiments of the disclosure may be applied to various communication systems having a similar technical background or channel shape. In addition, the embodiments of the disclosure may be applied to other communication systems through some modifications within a range that does not significantly depart from the scope of the disclosure as judged by a person having skilled technical knowledge.

In the disclosure, the terms of a physical channel and a signal of the related art may be used interchangeably with data or a control signal. For example, a physical downlink shared channel (PDSCH) is a physical channel through which data is transmitted, but in the disclosure, the PDSCH may be referred to as data. That is, PDSCH transmission/reception may be understood as data transmission/reception.

In the disclosure, higher signaling (or higher layer signal and higher layer signaling may be mixed) is a signal transmission method in which a base station is transmitted to a terminal using a downlink data channel of a physical layer, or from a terminal to a base station using an uplink data channel of a physical layer, and may also be referred to as RRC signaling or MAC control element (CE).

As research on a 5G communication system is in progress, various methods for scheduling communication with a terminal are being discussed. Accordingly, an efficient scheduling and data transmission/reception method in consideration of the characteristics of the 5G communication system is required. Accordingly, in order to provide a plurality of services to a user in a communication system, a method and an apparatus using the same are required to provide each service within the same time period according to the characteristics of the corresponding service.

The terminal must receive separate control information from the base station in order to transmit or receive data to the base station. However, in the case of periodically generated traffic or a service type requiring low delay and/or high reliability, it may be possible to transmit or receive data without the separate control information. This transmission method is referred to as a data transmission method based on a configured grant (which may be mixed with a configured grant, grant-free, or configured scheduling in the disclosure. The method of receiving or transmitting data after receiving the data transmission resource configuration and related information configured through the control information is called the first signal transmission/reception type, and a method of transmitting or receiving data based on information configured in advance without control information may be referred to as a second signal transmission/reception type. For the second signal transmission/reception type, a predetermined resource region exists periodically. In these regions, there may exist uplink type 1 grant (UL type 1 grant), which is a method configured only with higher-order signals, and uplink type 2 grant (UL type 2 grant) (or semi-persistent scheduling, SPS), which is a method configured by a combination of an upper signal and an L1 signal (that is, downlink control information {DCI}). In the case of the UL type 2 grant (or SPS), some information is higher signals, and other than that, whether or not actual data is transmitted is determined by a signal L1. Here, the signal L1 can be largely divided into a signal indicating activation of a resource configured to a higher and a signal indicating release (or deactivation) of the activated resource again.

In the disclosure, when the DL SPS transmission period has an aperiodic or is less than one slot, a method for determining a corresponding semi-static HARQ-ACK codebook and a dynamic HARQ-ACK codebook, and a HARQ-ACK information transmission method are included.

FIG. 1 is a diagram illustrating a transmission structure of a time-frequency domain, which is a radio resource region of a 5G or NR system according to an embodiment of the disclosure.

Referring to FIG. 1, in the radio resource region, the horizontal axis represents the time domain and the vertical axis represents the frequency domain. The minimum transmission unit in the time domain is an OFDM symbol, and $N_{symb}$ OFDM symbols 102 are gathered to constitute one slot 106. The length of a subframe may be defined as 1.0 ms, and a radio frame 114 may be defined as 10 ms. The minimum transmission unit in the frequency domain is a subcarrier, and the bandwidth of the entire system transmission bandwidth may be composed of a total of $N_{BW}$ subcarriers 104. However, these specific numerical values may be variably applied depending on the system.

The basic unit of the time-frequency resource region is a resource element (RE) 112 and may be represented by an OFDM symbol index and a subcarrier index. A resource block (RB) 108 may be defined as $N_{RB}$ consecutive subcarriers 110 in the frequency domain.

In general, the minimum transmission unit of data is an RB unit. In the 5G or NR system, $N_{symb}=14$ and $N_{RB}=12$ in general, and $N_{BW}$ may be proportional to the bandwidth of the system transmission band. The data rate increases in proportion to the number of RBs scheduled for the UE. In the 5G or NR system, in the case of a frequency division duplex (FDD) system that divides DL and UL by frequency for operation, a DL transmission bandwidth and a UL transmission bandwidth may be different from each other. A channel bandwidth represents an RF bandwidth corresponding to a system transmission bandwidth. Table 1 below shows a corresponding relationship between the system transmission bandwidth and the channel bandwidth defined in an LTE system, which is the 4th generation wireless communication before the 5G or NR system. For example, in an LTE system having a channel bandwidth of 10 MHz, the transmission bandwidth may be constituted of 50 RBs.

TABLE 1

| Channel bandwidth) BW$_{Channel}$ [MHz] | 1.4 | 3 | 5 | 10 | 15 | 20 |
|---|---|---|---|---|---|---|
| Transmission bandwidth configuration) N$_{RB}$ | 6 | 15 | 25 | 50 | 75 | 100 |

In the 5G or NR system, a channel bandwidth wider than the channel bandwidth of LTE presented in Table 1 may be employed. Table 2 shows a corresponding relationship among the system transmission bandwidth, the channel bandwidth, and the subcarrier spacing (SCS) in the 5G or NR system.

TABLE 2

| | SCS [kHz] | Channel bandwidth BW$_{Channel}$ [MHz] | | | | | | | | |
|---|---|---|---|---|---|---|---|---|---|---|
| | | 5 | 10 | 15 | 20 | 25 | 40 | 50 | 60 | 80 | 100 |
| Maximum Transmission bandwidth N$_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G or NR system, scheduling information for DL data or UL data is transmitted from a base station to a UE through downlink control information (DCI). DCI is defined according to various formats, and whether DCI is scheduling information for UL data (UL grant) or scheduling information for DL data (DL grant) according to each format, whether DCI is a compact DCI with a small size of control information, whether spatial multiplexing using multiple antennas is applied, whether DCI is DCI for power control, etc., may be indicated. For example, DCI format 1_1, which is scheduling control information (DL grant) for DL data, may include at least one of the following control information.

Carrier indicator: indicates in which frequency carrier corresponding information is transmitted.

DCI format indicator: indicator for distinguishing whether corresponding DCI is for DL or UL.

Bandwidth part (hereinafter, BWP) indicator: indicates in which BWP corresponding information is transmitted.

Frequency domain resource allocation: indicates RB in frequency domain allocated for data transmission. Resource to be expressed is determined according to system bandwidth and resource allocation method.

Time domain resource allocation: indicates that data-related channel is to be transmitted in arbitrary symbol of arbitrary slot VRB-to-PRB mapping: indicates how to map virtual RB (hereinafter VRB) index and physical RB (hereinafter PRB) index.

Modulation and coding scheme (hereinafter referred to as MCS): indicates modulation scheme and coding rate used for data transmission. That is, this can indicate coding rate value that can inform transport block size (TBS) and channel coding information along with information on whether corresponding information quadrature phase shift keying (QPSK), 16 quadrature amplitude modulation (16 QAM), 64 QAM, or 256 QAM.

Codeblock group (CBG) transmission information: indicates information on which CBG is transmitted when CBG retransmission is configured.

HARQ process number: indicates the process number of HARQ.

New data indicator: indicates whether corresponding information is HARQ initial transmission or retransmission.

Redundancy version: indicates redundancy version of HARQ.

Physical uplink control channel (PUCCH) resource indicator: indicates PUCCH resource for transmitting ACK/NACK information for DL data.

PDSCH-to-HARQ feedback timing indicator: indicates slot in which ACK/NACK information for DL data is transmitted.

Transmit power control (TPC) command for PUCCH: indicates transmission power control command for PUCCH, which is UL control channel.

In the case of PUSCH transmission, time domain resource assignment may be transmitted by information about a slot in which the PUSCH is transmitted, a start OFDM symbol position S in the corresponding slot, and the number of OFDM symbols L to which the PUSCH is mapped. The aforementioned S may be a relative position from the start of the slot, L may be the number of consecutive OFDM symbols, and S and L may be determined from a start and length indicator value (SLIV) defined as follows.

$$\text{If } (L-1) \le 7 \text{ then}$$
$$SLIV = 14*(L-1) + S$$
$$\text{else}$$
$$SLIV = 14*(14-L+1) + (14-1-S)$$
$$\text{where } 0 < L \le 14-S$$

In a 5G or NR system, a table including information on a SLIV value, a PUSCH mapping type, and a slot in which a PUSCH is transmitted may be configured in one row through RRC configuration in general. Thereafter, in the time domain resource allocation of DCI, by indicating an index value in the configured table, the base station may transmit the SLIV value, the PUSCH mapping type, and the information on the slot in which the PUSCH may be transmitted to the UE. This method may be also applied to PDSCH.

Specifically, when the base station indicates, to the UE, a time resource allocation field index m included in the DCI for scheduling the PDSCH, this informs a combination of DRMS type A position information, PDSCH mapping type information, slot index $K_0$, data resource starting symbol S, and data resource allocation length L corresponding to m+1 in a table indicating time domain resource allocation information. As an example, Table 3 below is a table including PDSCH time domain resource allocation information based on normal cyclic prefix.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, DMRS-typeA-position is a field indicating a symbol position at which a DMRS is transmitted in one slot indicated by a system information block (SIB), which is one of UE common control information. A possible values for this field is 2 or 3. When the number of symbols constituting one slot is 14 in total and a first symbol index is 0, 2 means a third symbol and 3 means a fourth symbol. In Table 3, the PDSCH mapping type is information indicating the position of a DMRS in a scheduled data resource region. When the PDSCH mapping type is A, the DMRS is always transmitted and received in the symbol position determined in DMRS-typeA-position regardless of the allocated data time domain resource. When the PDSCH mapping type is B, the DMRS is always transmitted and received in a first symbol among the allocated data time domain resources. In other words, PDSCH mapping type B does not use the DMRS-typeA-position information.

In Table 1, $K_0$ means an offset between a slot index to which a PDCCH through which DCI is transmitted belongs and a slot index to which a PDSCH or PUSCH scheduled in the corresponding DCI belongs. For example, when the slot index of the PDCCH is n, the slot index of the PDSCH or the PUSCH scheduled by the DCI of the PDCCH is n+$K_0$. In Table 3, S means the starting symbol index of the data time domain resource within one slot. The range of possible S values is usually 0 to 13 on a normal cyclic prefix basis. In Table 1, L denotes a data time domain resource interval length within one slot. Possible values of L range from 1 to 14.

In the 5G or NR system, the PUSCH mapping types are defined as type A and type B. In PUSCH mapping type A, a first OFDM symbol among DMRS OFDM symbols is located in a second or third OFDM symbol in the slot. In PUSCH mapping type B, a first OFDM symbol among DMRS OFDM symbols is located in the first OFDM symbol in the time domain resource allocated for PUSCH transmission. The above-described PUSCH time domain resource allocation method may be equally applicable to PDSCH time domain resource allocation.

DCI may be transmitted on a physical downlink control channel (PDCCH) (or control information, hereinafter may be used interchangeably), which is a downlink physical control channel through a channel coding and modulation process. In general, DCI is independently scrambled with a specific radio network temporary identifier (RNTI) (or UE identifier) for each UE, a cyclic redundancy check (CRC) is added, and, after channel coding, each resultant information is configured as an independent PDCCH and transmitted. The PDCCH is mapped to a control resource set (CORESET) configured for the UE and transmitted.

Downlink data may be transmitted on a physical downlink shared channel (PDSCH), which is a physical channel for downlink data transmission. The PDSCH may be transmitted after a control channel transmission section, and scheduling information such as a specific mapping position and a modulation method in a frequency domain is determined based on DCI transmitted through the PDCCH.

Among control information constituting DCI, through an MCS, the base station notifies the UE of a modulation scheme applied to a PDSCH to be transmitted to the UE and the size of data to be transmitted (transport block size, {TBS}). In an embodiment, the MCS may consist of 5 bits or more or fewer bits. The TBS corresponds to the data size before channel coding for error correction is applied to data (transport block {TB}) to be transmitted by the base station.

A transport block (TB) in the disclosure may include a medium access control (MAC) header, a MAC CE, one or more MAC service data units (SDUs), and padding bits. Alternatively, TB may indicate a data unit or an MAC protocol data unit (PDU) that is transmitted from an MAC layer to a physical layer.

Modulation schemes supported by the 5G or NR system are quadrature phase shift keying (QPSK), 16 quadrature amplitude modulation (QAM), 64 QAM, and 256 QAM, and the modulation order $Q_m$ thereof is 2, 4, 6, 8, respectively. That is, 2 bits per symbol for QPSK modulation, 4 bits per OFDM symbol for 16 QAM, 6 bits per symbol for 64 QAM modulation, and 8 bits per symbol for 256 QAM modulation may be transmitted, respectively.

When the PDSCH is scheduled by the DCI, HARQ-ACK information indicating whether decoding for the PDSCH succeeds or fails is transmitted from the UE to the base station through the PUCCH. This HARQ-ACK information is transmitted in a slot indicated by a PDSCH-to-HARQ feedback timing indicator included in the DCI for scheduling the PDSCH. Values respectively mapped to 1- to 3-bit PDSCH-to-HARQ feedback timing indicators are configured by higher signals as shown in Table 4. When the PDSCH-to-HARQ feedback timing indicator indicates k, the UE transmits HARQ-ACK information after slot k in a slot n in which the PDSCH is transmitted, that is, in n+k slot.

TABLE 4

| PDSCH-to-HARQ_feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |

TABLE 4-continued

PDSCH-to-HARQ feedback timing indicator

| 1 bit | 2 bits | 3 bits | Number of slots k |
|---|---|---|---|
| | | '110' | $7^{th}$ value provided by dl-DataToUL-ACK |
| | | '111' | $8^{th}$ value provided by dl-DataToUL-ACK |

When the PDSCH-to-HARQ feedback timing indicator is not included in a DCI format 1_1 for scheduling the PDSCH, the UE transmits HARQ-ACK information in a slot n+k according to a k value configured for higher signaling. At the time of transmission of HARQ-ACK information on the PUCCH, the UE transmits the HARQ-ACK information to the base station using PUCCH resource determined based on a PUCCH resource indicator included in the DCI for scheduling the PDSCH. In this case, the ID of the PUCCH resource mapped to the PUCCH resource indicator may be configured through higher signaling.

Figure 2:
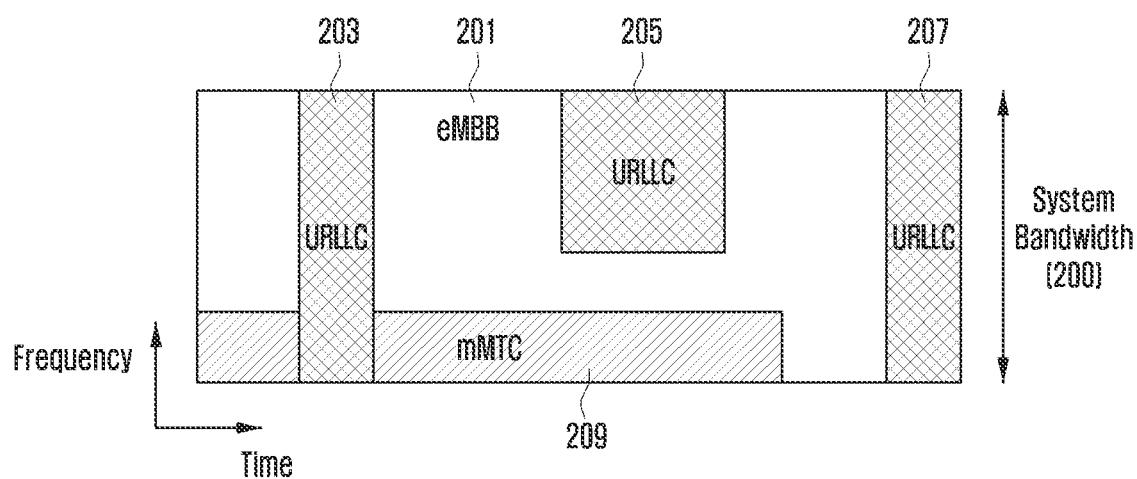
FIG. 2 is a diagram illustrating an example of allocating data for eMBB, URLLC, and mMTC in a time-frequency resource region in a 5G or NR system according to an embodiment of the disclosure.

FIG. 2 is a diagram illustrating an example of allocating data for eMBB, URLLC, and mMTC in a time-frequency resource region in a 5G or NR system according to an embodiment of the disclosure.

Referring to FIG. 2, data for eMBB, URLLC, and mMTC may be allocated in the entire system frequency band 200. When URLLC data 203, 205, and 207 are required to be generated and transmitted while eMBB data 201 and mMTC data 209 are allocated and transmitted in a specific frequency band, a transmitter may transmit the URLLC data 203, 205, and 207 without transmitting or emptying a portion to which the eMBB data 201 and the mMTC data 209 are already allocated. Among the above-described services, since it is necessary to reduce delay time for URLLC, URLLC data may be allocated and transmitted to a portion of a resource to which eMBB or mMTC data is allocated. When the URLLC data is additionally allocated and transmitted in the resource to which the eMBB data is allocated, the eMBB data may not be transmitted in the overlapping time-frequency resource, and thus the transmission performance of the eMBB data may be lowered. That is, eMBB data transmission failure due to URLLC allocation may occur.

Figure 3:
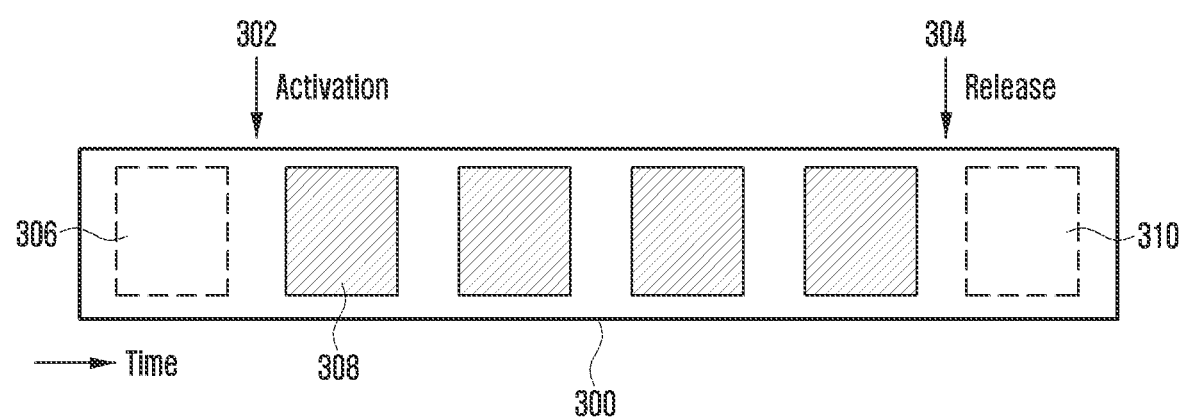
FIG. 3 is a diagram illustrating a grant-free transmission/reception operation according to an embodiment of the disclosure.

FIG. 3 is a diagram illustrating a grant-free transmission/reception operation according to an embodiment of the disclosure.

There are a first signal transmission/reception type in which the UE receives downlink data from the base station according to information configured only by a higher signals and a second signal transmission/reception type in which the UE receives downlink data according to transmission configuration information indicated by the higher signal and an L1 signal. In this disclosure, a method of operating a UE for the second signal transmission/reception type will be mainly described. In the disclosure, SPS, which is the second signal type for downlink data reception, means grant-free PDSCH transmission in downlink. In DL SPS, the UE may receive grant-free PDSCH transmission through higher signal configuration and additional configuration information indicated by DCI.

The DL SPS means downlink semi-persistent scheduling, and is a method in which a base station periodically transmits/receives downlink data information to a UE based on information configured as higher signaling without scheduling specific downlink control information. The DL SPS can be applied in VoIP or traffic situations that occur periodically. Alternatively, resource configuration for the DL SPS may be periodic, but actually generated data may be aperiodic. In this case, since the UE does not know whether actual data is generated from the periodically configured resource, it may be possible to perform the following two types of operations.

Method 1: For periodically configured DL SPS resource region, UE transmits, to base station, HARQ-ACK information for uplink resource region corresponding to corresponding resource region for demodulation and/or decoding (hereinafter, demodulation/decoding) result of received data.

Method 2: For periodically configured DL SPS resource region, when signal detection for at least DMRS or data is successfully performed, UE transmits, to base station, HARQ-ACK information for uplink resource region corresponding to corresponding resource region for demodulation and/decoding result of received data.

Method 3: For periodically configured DL SPS resource region, when succeeding in decoding/demodulation (i.e., ACK is generated), UE transmits, to base station, HARQ-ACK information for uplink resource region corresponding to corresponding resource region for demodulation and/decoding result of received data.

In method 1, even if the base station does not actually transmit downlink data for the DL SPS resource region, the UE always transmits HARQ-ACK information to an uplink resource region corresponding to the DL SPS resource region. In method 2, since the base station does not know when to transmit data to the DL SPS resource region, it may be possible to transmit HARQ-ACK information in a situation in which the UE knows whether to transmit/receive data, such as when DMRS detection is successful or CRC detection is successful. Method 3 transmits the HARQ-ACK information to an uplink resource region corresponding to the DL SPS resource region only when the UE succeeds in data demodulation/decoding.

Among the above-described methods, it may be possible for the UE to always support one or two or more. It may be possible to select one of the above methods as a 3GPP standard specification or a higher signal. For example, when method 1 is indicated by a higher signal, the UE may be able to process HARQ-ACK information for the corresponding DL SPS based on method 1. Alternatively, it may be possible to select one method according to DL SPS higher configuration information. For example, when the transmission period is n slots or more in the DL SPS higher configuration information, the UE may apply method 1, and in the opposite case, the UE may apply method. In this example, the transmission period is mentioned as an example of a criterion for selecting one method, but the transmission period may be sufficiently possible to be applied by the applied MCS table, DMRS configuration information, resource configuration information, and the like.

The UE performs downlink data reception in a downlink resource region configured for higher signaling. It may be possible to perform activation or release of the downlink resource region configured by higher signaling by L1 signaling.

FIG. 3 illustrates the operation for a DL SPS. The UE configures the next DL SPS configuration information from the higher signal.

Periodicity: DL SPS transmission period
nrofHARQ-Processes: number of HARQ processes configured for DL SPS
n1PUCCH-AN: HARQ resource configuration information for DL SPS mcs-Table: MCS table configuration information applied to DL SPS In the disclosure, all DL SPS configuration information can be configured for each Pcell or Scell, and can also be configured for each frequency band section (bandwidth part {BWP}). In addition, it may be possible to configure one or more DL SPSs for each BWP for each specific cell.

Referring to FIG. 3, the UE determines grant-free transmission/reception configuration information 300 through reception of a higher signal for the DL SPS. The DL SPS may be able to transmit/receive data to the configured resource region 308 after receiving 302 a DCI indicating activation, and may not transmit/receive data to/from the resource region 306 before receiving the DCI. In addition, the UE cannot perform data reception for the resource region 310 after receiving 304 a DCI indicating release.

The UE verifies a DL SPS assignment PDCCH when both of the following two conditions are satisfied for SPS scheduling activation or release.

Condition 1: Case in which the CRC bit of a DCI format transmitted in the PDCCH is scrambled with CS-RNTI configured by higher signaling.

Condition 2: Case in which a new data indicator (NDI) field for activated transport block is configured to 0

When some of fields constituting the DCI format transmitted to the DL SPS assignment PDCCH are the same as those shown in Table 5 or Table 6, the UE determines that information in the DCI format is valid activation or effective release of the DL SPS. For example, when the UE detects the DCI format including the information shown in Table 5, the UE determines that the DL SPS is activated. As another example, when the UE detects the DCI format including information shown in Table 6, the UE determines that the DL SPS is released.

When some of fields constituting the DCI format transmitted to the DL SPS assignment PDCCH are not the same as the disclosed in Table 5 (special field configuration information for activating DL SPS) or Table 6 (special field configuration information for releasing DL SPS), the UE determines that the DCI format is detected as a mismatched CRC.

TABLE 5

|  | DCI format 1_0 | DCI format 1_1 |
| --- | --- | --- |
| HARQ process number | set to all '0's | set to all '0's |
| Redundancy version | set to '00' | For the enabled transport block: set to '00' |

TABLE 6

| DCI field | DCI format 1_0 |
| --- | --- |
| HARQ process number | set to all '0's |
| Redundancy version | set to '00' |
| Modulation and coding scheme | set to all '1's |
| Resource block assignment | set to all '1's |

When the UE receives a PDSCH without receiving a PDCCH or receives a PDCCH indicating SPS PDSCH release, the UE generates a corresponding HARQ-ACK information bit. In addition, at least in Rel-15 NR, the UE does not expect to transmit HARQ-ACK information(s) for reception of two or more SPS PDSCHs on one PUCCH resource. In other words, at least in Rel-15 NR, the UE includes only HARQ-ACK information for one SPS PDSCH reception in one PUCCH resource.

The DL SPS may also be configured in a primary (P) cell and a secondary (S) cell. Parameters that can be configured for DL SPS higher signaling are as follows.

Periodicity: transmission period of DL SPS nrofHARQ-processes: number of HARQ processes that can be configured for DL SPS n1PUCCH-AN: PUCCH HARQ resource for DL SPS, base station configures resource as PUCCH format 0 or 1.

The above-mentioned Table 5 to Table 6 will be possible fields in a situation where only one DL SPS can be configured per cell and per BWP. In a situation in which a plurality of DL SPSs are configured for each cell and for each BWP, a DCI field for activating (or releasing) each DL SPS resource may vary. The disclosure provides a method for solving such a situation.

In the disclosure, not all DCI formats described in Table 5 and Table 6 are used to activate or release the DL SPS resource, respectively. For example, DCI format 1_0 and DCI format 1_1 used to schedule the PDSCH may be utilized for activating a DL SPS resource. For example, DCI format 1_0 used for scheduling the PDSCH may be used for releasing the DL SPS resource.

Figure 4:
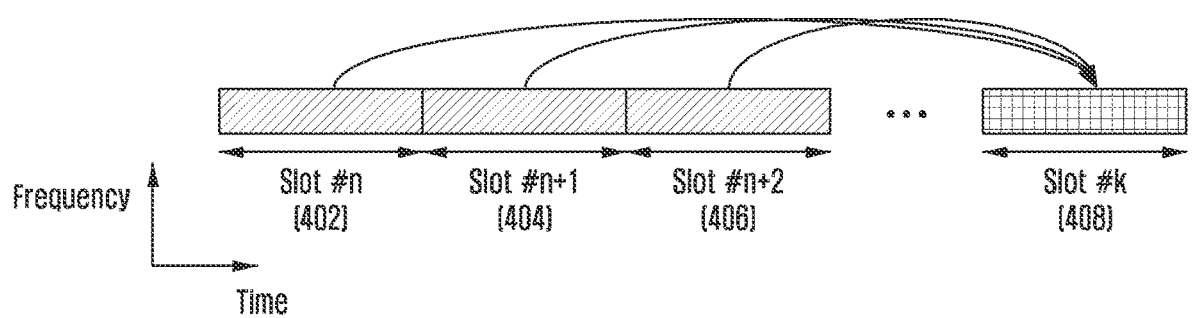
FIG. 4 is a diagram illustrating a method of configuring a semi-static HARQ-ACK codebook in an NR system according to an embodiment of the disclosure.

FIG. 4 is a diagram illustrating a method of configuring a semi-static HARQ-ACK codebook in an NR system according to an embodiment of the disclosure.

Referring to FIG. 4, in a situation where the number of HARQ-ACK PUCCHs that the UE can transmit in one slot is limited to one, when the UE receives a semi-static HARQ-ACK codebook higher configuration, the UE receives a PDSCH within a HARQ-ACK codebook in a slot indicated by a value of a PDSCH-to-HARQ_feedback timing indicator within a DCI format 1_0 or DCI format 1_1, or reports HARQ-ACK information for SPS PDSCH release. The UE reports a HARQ-ACK information bit value in the HARQ-ACK codebook as NACK in a slot that is not indicated by a PDSCH-to-HARQ_feedback timing indicator field in DCI format 1_0 or DCI format 1_1. When the UE reports only HARQ-ACK information for one SPS PDSCH release or one PDSCH reception in $M_{A,C}$ cases for candidate PDSCH reception, and the report is scheduled by DCI format 1_0 including information indicating 1 in the counter DAI field in a Pcell, the UE determines one HARQ-ACK codebook for the corresponding SPS PDSCH release or the corresponding PDSCH reception.

The other cases follow a method of determining the HARQ-ACK codebook according to the method described below.

Assuming that a set of PDSCH reception candidate cases in a serving cell c is $M_{A,c}$, $M_{A,c}$ can be obtained by the following pseudo-code 1 steps.

Start Pseudo-Code 1

Step 1: Initialize j to 0 and $M_{A,c}$ to null set. Initialize k, which is HARQ-ACK transmission timing index, to 0.

Step 2: Configure R as a set of rows in a table including slot information to which PDSCH is mapped, starting symbol information, number of symbols or length information. If PDSCH-capable mapping symbol indicated by each value of R is configured as UL symbol according to DL and UL configuration configured in higher, corresponding row is deleted from R.

Step 3-1: If UE can receive one unicast PDSCH in one slot and R is not null set, one is added to set $M_{A,c}$.

Step 3-2: If UE can receive one or more PDSCHs for unicast in one slot, count the number of PDSCHs that can be assigned to different symbols in the calculated R, and add the counted number to $M_{A,c}$.

Step 4: Restart from Step 2 by incrementing k by 1.

End Pseudo-Code 1

Taking the above-described pseudo-code 1 as an example of FIG. 4, in order to perform HARQ-ACK PUCCH transmission in a slot #k 408, all slot candidates capable of PDSCH-to-HARQ-ACK timing that can indicate slot #k 408 are considered. In FIG. 4, it is assumed that HARQ-ACK transmission is possible in a slot #k 408 by a combination of PDSCH-to-HARQ-ACK timing that is possible only for PDSCHs scheduled in a slot #n 402, slot #n+1 404, and a slot #n+2 406. In addition, the maximum number of schedulable PDSCHs for each slot is derived in consideration of time domain resource configuration information of each schedulable PDSCH in the slots 402, 404, and 406 and information indicating whether a symbol in a slot is downlink or uplink. For example, assuming that maximum scheduling is possible for two PDSCHs in the slot 402, three PDSCHs in the slot 404, and two PDSCHs in the slot 406, the maximum number of PDSCHs included in the HARQ-ACK codebook transmitted in the slot 408 is 7 in total. This is called cardinality of the HARQ-ACK codebook.

In a specific slot, Step 3-2 is described through the following Table 7 (Default PDSCH time domain resource allocation A for normal CP).

TABLE 7

| Row index | dmrs-TypeA-Position | PDSCH mapping type | $K_0$ | S | L | Ending | Order |
|---|---|---|---|---|---|---|---|
| 1 | 2 | Type A | 0 | 2 | 12 | 13 | 1× |
|  | 3 | Type A | 0 | 3 | 11 | 13 | 1× |
| 2 | 2 | Type A | 0 | 2 | 10 | 11 | 1× |
|  | 3 | Type A | 0 | 3 | 9 | 11 | 1× |
| 3 | 2 | Type A | 0 | 2 | 9 | 10 | 1× |
|  | 3 | Type A | 0 | 3 | 8 | 10 | 1× |
| 4 | 2 | Type A | 0 | 2 | 7 | 8 | 1× |
|  | 3 | Type A | 0 | 3 | 6 | 8 | 1× |
| 5 | 2 | Type A | 0 | 2 | 5 | 6 | 1× |
|  | 3 | Type A | 0 | 3 | 4 | 6 | 1× |
| 6 | 2 | Type B | 0 | 9 | 4 | 12 | 2× |
|  | 3 | Type B | 0 | 10 | 4 | 13 | 3 |
| 7 | 2 | Type B | 0 | 4 | 4 | 7 | 1× |
|  | 3 | Type B | 0 | 6 | 4 | 9 | 2 |
| 8 | 2, 3 | Type B | 0 | 5 | 7 | 11 | 1× |
| 9 | 2, 3 | Type B | 0 | 5 | 2 | 6 | 1× |
| 10 | 2, 3 | Type B | 0 | 9 | 2 | 10 | 2× |
| 11 | 2, 3 | Type B | 0 | 12 | 2 | 13 | 3× |
| 12 | 2, 3 | Type A | 0 | 1 | 13 | 13 | 1× |
| 13 | 2, 3 | Type A | 0 | 1 | 6 | 6 | 1× |
| 14 | 2, 3 | Type A | 0 | 2 | 4 | 5 | 1 |
| 15 | 2, 3 | Type B | 0 | 4 | 7 | 10 | 1× |
| 16 | 2, 3 | Type B | 0 | 8 | 4 | 11 | 2× |

Table 7 is a time resource allocation table in which the UE operates as a default before the UE receives time resource allocation with a separate RRC signal. For reference, a PDSCH time resource allocation value is determined by DMRS-typeA-position, which is a UE common RRC signal, in addition to separately indicating a row index value as RRC. In Table 7, the ending column and the order column are separately added values for convenience of explanation, and it may be possible that they do not actually exist. The meaning of the ending column means the ending symbol of a scheduled PDSCH, and the order column means a code position value located in a specific codebook in the semi-static HARQ-ACK codebook. Table 7 is applied to time resource allocation applied in DCI format 1_0 of the common search region of the PDCCH.

In order for the UE to determine the HARQ-ACK codebook by calculating the maximum number of non-overlapping PDSCHs within a specific slot, the UE performs the following steps.

Step 1: Retrieve a PDSCH allocation value that ends first in a slot among all the rows of the PDSCH time resource allocation table. In Table 7, it can be seen that row index 14 ends first. Mark row index 14 as "1" in the order column. Other row indexes overlapping the corresponding row index 14 by at least one symbol are indicated as "1x" in the order column.

Step 2: Retrieve a PDSCH allocation value that ends first among the remaining row indexes that are not displayed in the order column. In Table 7, a row with a row index of 7 and a DMRS-typeA-position value of 3 corresponds to the retrieved value. Other row indexes overlapping the corresponding row index by at least one symbol are indicated as "2x" in the order column.

Step 3: Repeat Step 2, and increase and display the order value. As an example, retrieve the PDSCH allocation value that ends first among the row indices not indicated in the order column in Table 7. In Table 7, a row with a row index of 6 and a DMRS-typeA-position value of 3 corresponds to this. Other row indices overlapping the corresponding row index by at least one symbol are indicated as "3x" in the order column.

Step 4: When the order is displayed in all row indices, corresponding step ends. The size of the corresponding order is the maximum number of PDSCHs that can be scheduled without time overlap within the corresponding slot. Scheduling without time overlap means that different PDSCHs are scheduled by TDM.

In the order column of Table 7, the maximum value of order means a HARQ-ACK codebook size of the corresponding slot, and the order value means a HARQ-ACK codebook point at which the HARQ-ACK feedback bit for the corresponding scheduled PDSCH is located. For example, row index 16 of Table 7 means that it exists at a second code position in a semi-static HARQ-ACK codebook having a size 3. The UE transmitting the HARQ-ACK feedback may obtain $M_{A,c}$ as pseudo-code 1 or pseudo-code 2 steps when it is assumed that a set of occasion for candidates of PDSCH receptions in a serving cell c is $M_{A,c}$. $M_{A,c}$ may be used to determine the number of HARQ-ACK bits to be transmitted by the UE. Specifically, the HARQ-ACK codebook may be configured using the cardinality of the $M_{A,c}$ set.

As another example, considerations for determining the semi-static HARQ-ACK codebook (or type 1 HARQ-ACK codebook) may be as follows.

a) on a set of slot timing values $K_1$ associated with the active UL BWP a) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0 b) If the UE is configured to monitor PDCCH for DCI format 1_1 for serving cell c, $K_1$ is provided by dl-DataToUL-ACK for DCI format 1_1 b) on a set of row indexes R of a table that is provided either by a first set of row indexes of a table that is provided by PDSCH-TimeDomainResourceAllocationList in PDSCH-ConfigCommon or by Default PDSCH time domain resource allocation A [6, TS 38.214], or by the union of the first set of row indexes and a second set of row indexes, if provided by PDSCH-TimeDomainResourceAllocationList in PDSCH-Config, associated with the active DL BWP and defining respective sets of slot offsets $K_0$, start and length indicators SLIV, and PDSCH mapping types for PDSCH reception as described in [6, TS 38.214]

c) on the ratio $2^{\mu_{DL}-\mu_{UL}}$ between the downlink SCS configuration and the uplink SCS configuration $\mu_{UL}$ provided by subcarrierSpacing in BWP-Downlink and BWP-Uplink for the active DL BWP and the active UL BWP, respectively d) if provided, on TDD-UL-DL-ConfigurationCommon and TDD-UL-DL-ConfigDedicated as described in Subclause 11.1.

As another example, the pseudo-code for determining the HARQ-ACK codebook may be as follows.

Start Pseudo-Code 2

For the set of slot timing values 1, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a SPS PDSCH release is same as for a corresponding SPS PDSCH reception.

```
Set j=O - index of occasion for candidate PDSCH reception or SPS
PDSCH release
Set B= Ø
Set M_{A,c}= Ø
Set c(K_1) to the cardinality of set K_1
Set k =0 - index of slot timing values K_{1,k}, in descending order of the slot
timing values, in set K_1 for serving cell c
   while k<c(K_1)
       if mod(n_U-K_{1,k}+1, max(2^{μUL-μDL}, 1))=0
   Set n_D=O - index of a DL slot within an UL slot
       while n_D<max(2^{μDL-μUL}, 1)
           Set R to the set of rows
           Set c(R) to the cardinality of R
           Set r=0 - index of row in set R
           if slot n_U starts at a same time as or after a slot for an
active DL BWP change on serving cell c or an active UL BWP change on the PCell and
slot ⌊ (n_U-K_{1,k})*2^{μDL-μUL} ⌋ +n_D is before the slot for the active DL BWP change on
serving cell c or the active UL BWP change on the PCell
               continue;
           else
               while r<c(R)
                   if the UE is provided TDD-UL-DL-
ConfigurationCommon or TDD-UL-DL-ConfigDedicated and, for each slot from slot
⌊ (n_U-K_{1,k})*2^{μDL-μUL} ⌋ +n_D-N_{PDSCH}^{repeat}+1 to slot ⌊ (n_U-K_{1,k})*2^{μDL-μUL} ⌋ +n_D, at least one symbol of
the PDSCH time resource derived by row r is configured as UL where K_{1,k} is the k-th
slot timing value in set K_1,
                       R=R/r;
                   end if
                   r=r+1;
               end while
               if the UE does not indicate a capability to receive
more than one unicast PDSCH per slot and R ≠ Ø,
                   M_{A,c}=M_{A,c} ∪j;
                   j=j+1;
                   The UE does not expect to receive SPS
PDSCH release and unicast PDSCH in a same slot;
               else
                   Set c(R) to the cardinality of R
                   Set m to the smallest last OFDM symbol
index, as determined by the SLIV, among all rows of R
                   while R ≠ Ø
                       Set r=0
                       while r<c(R)
                           if S≤m for start OFDM symbol
index S for row r
                               b_{r,k,n_D}=j; - index of occasion ART
for candidate PDSCH reception or SPS PDSCH release associated with row r
                               R=R/r;
                               B=B ∪ b_{r,k,n_D}; ART
                           end if
                           r=r+1;
                       end while
                       M_{A,c} =M_{A,c} ∪j
```

```
        j=j+1;
        Set m to the smallest last OFDM
symbol index among all rows of R;
            end while
        end if
    end if
    n_D=n_D+1;
    end while
  end if
  k=k+1;
end while
```

End Pseudo-Code 2

In pseudo-code 2, the position of the HARQ-ACK codebook including HARQ-ACK information for DCI indicating DL SPS release is based on the position at which the DL SPS PDSCH is received. For example, when the starting symbol in which the DL SPS PDSCH is transmitted starts from the 4th OFDM symbol based on the slot and has a length of 5 symbols, the position of the HARQ-ACK information including the DL SPS release indicating release of the corresponding SPS is determined in the following method. Assuming that the starting symbol starts from the 4th OFDM symbol of the slot in which the DL SPS release is transmitted and the PDSCH having a length of 5 symbols is mapped, the position of the corresponding HARQ-ACK information is determined through the PDSCH-to-HARQ-ACK timing indicator and the PUCCH resource indicator included in the control information indicating the DL SPS release. As another example, when the start symbol in which the DL SPS PDSCH is transmitted starts from the 4th OFDM symbol based on the slot and has a length of 5 symbols, the position of the HARQ-ACK information including the DL SPS release indicating release of the corresponding SPS is determined in the following way. It is assumed that the PDSCH having a length of 5 symbols starting from the 4th OFDM symbol of the slot indicated by time domain resource allocation (TDRA) of DCI, which is a DL SPS release, is mapped, the position of the corresponding HARQ-ACK information is determined through the PDSCH-to-HARQ-ACK timing indicator and the PUCCH resource indicator included in the control information indicating the DL SPS release.

Figure 5:
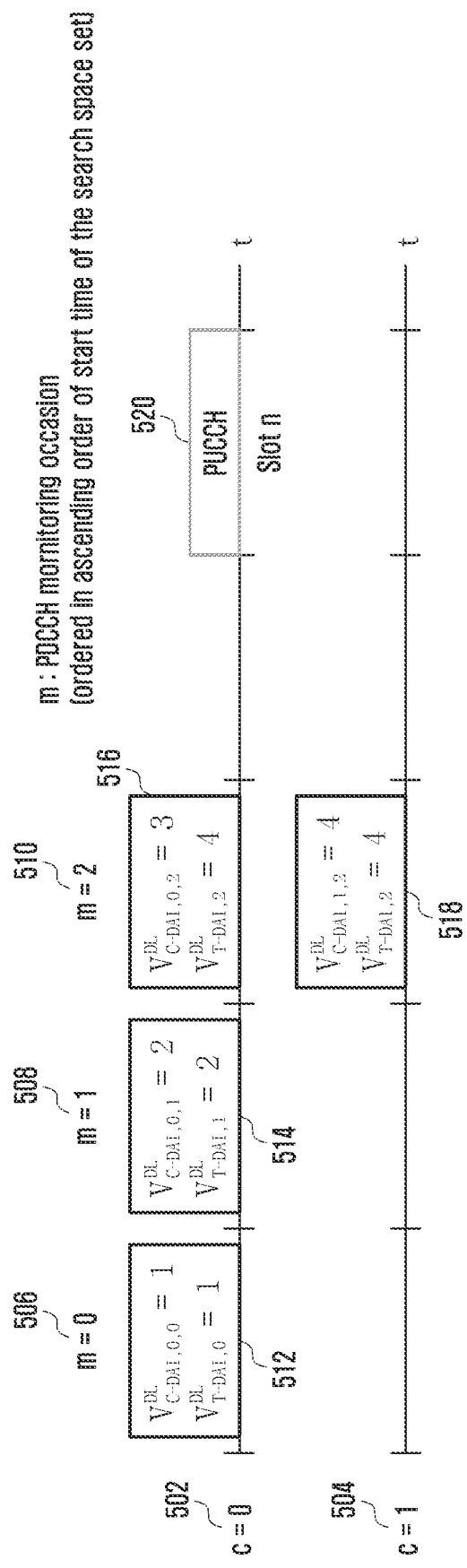
FIG. 5 is a diagram illustrating a method of configuring a dynamic HARQ-ACK codebook in an NR system according to an embodiment of the disclosure.

FIG. 5 is a diagram illustrating a method of configuring a dynamic HARQ-ACK codebook in an NR system according to an embodiment of the disclosure.

Based on a PDSCH-to-HARQ_feedback timing value for PUCCH transmission of HARQ-ACK information in a slot n for PDSCH reception or SPS PDSCH release, and $K_0$, which is transmission slot location information of the PDSCH scheduled in DCI format 1_0 or 1_1, a UE transmits HARQ-ACK information transmitted within one PUCCH in the corresponding slot n. Specifically, for transmitting the above-described HARQ-ACK information, the UE determines a HARQ-ACK codebook of the PUCCH transmitted in the slot determined by the PDSCH-to-HARQ feedback timing and $K_0$ based on DAI included in the DCI indicating PDSCH or SPS PDSCH release.

The DAI is composed of counter DAI and total DAI. The counter DAI is information indicating the position of HARQ-ACK information corresponding to the PDSCH scheduled in DCI format 1_0 or DCI format 1_1 in the HARQ-ACK codebook. Specifically, the value of counter DAI in DCI format 1_0 or 1_1 informs a cumulative value of PDSCH reception or SPS PDSCH release scheduled by DCI format 1_0 or DCI format 1_1 in a specific cell c. The above-described cumulative value is configured based on PDCCH monitoring occasion and a serving cell in which the scheduled DCI exists.

The total DAI is a value indicating the size of the HARQ-ACK codebook. Specifically, the value of total DAI means the total number of previously scheduled PDSCH or SPS PDSCH releases including a time point at which DCI is scheduled. The total DAI is a parameter used when the HARQ-ACK information in the serving cell c also includes HARQ-ACK information for the PDSCH scheduled in another cell including the serving cell c in a carrier aggregation (CA) situation. In other words, there is no Total DAI parameter in a system operating with one cell.

An example of the operation of the DAI is shown in FIG. 5.

Referring to FIG. 5, when the UE transmits the HARQ-ACK codebook selected based on the DAI to the PUCCH 520 in an nth slot of a carrier 0 (502) in a situation in which two carriers are configured, changes in the values of counter DAI (C-DAI) and total DAI (T-DAI) indicated by a DCI retrieved for each PDCCH monitoring occasion configured for each carrier are shown. First, in the DCI retrieved at m=0 (506), C-DAI and T-DAI indicate a value (512) of 1, respectively. The DCI retrieved at m=1 (508) indicates a value (514) in which C-DAI and T-DAI are 2, respectively. In the DCI retrieved in carrier 0 (c=0, 502) of m=2 (510), C-DAI indicates a value (516) of 3. In the DCI retrieved in carrier 1 (c=1, 504) of m=2 (510), C-DAI indicates a value (518) of 4. At this time, when carriers 0 and 1 are scheduled on the same monitoring occasion, T-DAI is all indicated as 4.

In FIGS. 4 and 5, the HARQ-ACK codebook determination is performed in a situation where only one PUCCH containing HARQ-ACK information is transmitted in one slot. This is called mode 1. As an example of a method in which one PUCCH transmission resource is determined within one slot, when PDSCHs scheduled in different DCIs are multiplexed into one HARQ-ACK codebook in the same slot and transmitted, the PUCCH resource selected for HARQ-ACK transmission is determined as the PUCCH resource indicated by the PUCCH resource indicator field indicated in the DCI that finally scheduled the PDSCH. That is, the PUCCH resource indicated by the PUCCH resource indicator field indicated in the DCI scheduled before the DCI is ignored.

The following description defines a method and apparatus for determining a HARQ-ACK codebook in a situation in which two or more PUCCHs containing HARQ-ACK information can be transmitted in one slot. This is called mode 2. The UE may be capable of operating only in mode 1 (transmitting only one HARQ-ACK PUCCH in one slot) or mode 2 (transmitting one or more HARQ-ACK PUCCHs in one slot). Alternatively, the UE supporting both mode 1 and mode 2 configures the base station to operate in only one mode by higher signaling, or mode 1 and mode 2 are implicitly determined by DCI format, RNTI, DCI specific field value, scrambling, etc. For example, a PDSCH scheduled in DCI format A and HARQ-ACK information associated therewith are based on mode 1, and a PDSCH scheduled in DCI format B and HARQ-ACK information associated therewith are based on mode 2.

Whether the above-described HARQ-ACK codebook is semi-static in FIG. 4 or dynamic in FIG. 5 is determined by an RRC signal.

Figure 6A:
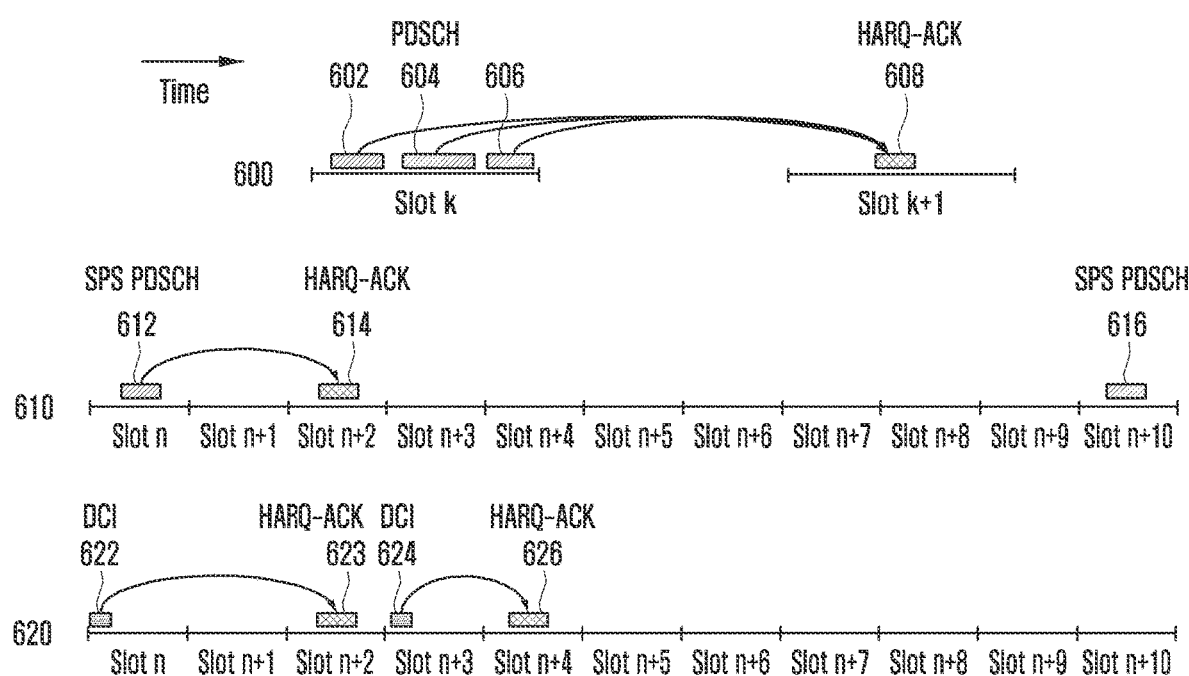
FIG. 6A is a diagram illustrating an example of a HARQ-ACK transmission process for a DL SPS according to an embodiment of the disclosure.

FIG. 6A is a diagram illustrating an example of a HARQ-ACK transmission process for a DL SPS according to an embodiment of the disclosure.

Referring to FIG. 6A, reference numeral 600 shows a situation in which the maximum receivable PDSCHs 602, 604, and 606 are mapped in a slot k without overlapping from the viewpoint of time resources. For example, if a PDSCH-to-HARQ feedback timing indicator is not included in a DCI format for scheduling a PDSCH, the UE transmits HARQ-ACK information 608 in a slot k+1 according to the value of 1 obtained by configuring HARQ-ACK information through higher signaling. Accordingly, the size of the semi-static HARQ-ACK codebook of slot k+1 is equal to the maximum number of transmittable PDSCHs in the slot k, and will be 3. In addition, when the HARQ-ACK information is 1 bit for each PDSCH, the HARQ-ACK codebooks 600 to 608 of FIG. 6A will be composed of a total of 3 bits of [X, Y, Z], X may be HARQ-ACK information on the PDSCH 602, Y may be HARQ-ACK information on the PDSCH 604, and Z may be HARQ-ACK information on the PDSCH 606. If PDSCH reception is successful, the corresponding information will be mapped to ACK, otherwise it will be mapped to NACK. In addition, when the actual DCI does not schedule the corresponding PDSCH, the UE reports NACK. Specifically, the position of the HARQ-ACK codebook located according to SLIV of PDSCH that can be scheduled in DCI (which can be understood as the position of the HARQ-ACK bit on the HARQ-ACK codebook hereinafter) may vary, and the position of the HARQ-ACK codebook may be determined by Table 7 or pseudo code 1 or pseudo code 2.

Reference numeral 610 of FIG. 6A shows HARQ-ACK transmission in a situation in which DL SPS is activated. In Rel-15 NR, the minimum period of the DL SPS is 10 ms, and in 610, since the length of one slot is 1 ms in a subcarrier interval of 15 kHz, an SPS PDSCH 612 is transmitted in the slot n, and then an SPS PDSCH 616 in a slot n+10 is transmitted.

HARQ-ACK information for each SPS PDSCH is a higher signal, indicates a period for the SPS, HARQ-ACK transmission resource information, MCS table configuration, and the number of HARQ processes, and then indicates a frequency resource, a time resource, an MCS value, etc., according to information included in the DCI format indicating the corresponding SPS activation. For reference, a PUCCH resource through which HARQ-ACK information is transmitted may also be configured as a higher signal, and the PUCCH resource has the following properties.

Whether hopping is performed
PUCCH format (starting symbol, symbol length, etc.)
Here, MCS table configuration and HARQ-ACK transmission resource information may not exist. When the HARQ-ACK transmission resource information is present, Rel-15 NR supports PUCCH format 0 or 1 that can transmit up to 2 bits. However, in a subsequent release, PUCCH format 2, 3 or 4 of 2 bits or more can be sufficiently supported.

Since the HARQ-ACK transmission resource information is included in DL SPS higher signal configuration, the UE may be able to ignore the PUCCH resource indicator in the DCI format indicating DL SPS activation. Alternatively, there may be no PUCCH resource indicator field itself in the corresponding DCI format. On the other hand, when there is no HARQ-ACK transmission resource information in the DL SPS higher signal configuration, the UE transmits HARQ-ACK information corresponding to the DL SPS in the PUCCH resource determined in the PUCCH resource indicator of the DCI format for activating the DL SPS. In addition, a difference between a slot in which the SPS PDSCH is transmitted and a slot in which the corresponding HARQ-ACK information is transmitted is determined by the value indicated by the PDSCH to HARQ-ACK feedback timing indicator of the format of the DCI for activating the DL SPS. Alternatively, when there is no indicator, the difference therebetween follows a specific value configured as a higher signal in advance. For example, as in reference numeral 610 of FIG. 6A, when the PDSCH to HARQ-ACK feedback timing indicator is 2, HARQ-ACK information for the SPS PDSCH 612 transmitted in the slot n is transmitted through the PUCCH 614 in a slot n+2. In addition, the PUCCH through which the corresponding HARQ-ACK information is transmitted may be configured as a higher signal or the corresponding resource may be determined by a signal L1 indicating DL SPS activation. When it is assumed that a maximum of three PDSCHs can be received as in 600 of FIG. 6A and the time resource of PDSCH 612 is the same as that of PDSCH 604, the position of the HARQ-ACK codebook for the SPS PDSCH 612 transmitted to the PUCCH 614 is located at a Y-th among [X Y Z].

When a DCI indicating DL SPS release is transmitted, the UE needs to transmit HARQ-ACK information for the DCI to the base station. However, in the case of a semi-static HARQ-ACK codebook, as described above in the disclosure, the size of the HARQ-ACK codebook and its position are determined by a time resource region to which the PDSCH is allocated and a slot interval (PDSCH to HARQ-ACK feedback timing) between the PDSCH and HARQ-ACK indicated by the signal L1 or the higher signal. Therefore, when the HARQ-ACK for DCI indicating DL SPS release is transmitted using the semi-static HARQ-ACK codebook, a specific rule is required rather than arbitrarily determining the position in the HARQ-ACK codebook, and in Rel-15 NR, the position of HARQ-ACK information for DCI indicating DL SPS release is mapped identically to the transmission resource region of the corresponding DL SPS PDSCH.

As an example, reference numeral 620 of FIG. 6A shows a situation in which a DCI 622 indicating release of the activated DL SPS PDSCH is transmitted in the slot n. When the PDSCH to HARQ-ACK feedback timing indicator included in the corresponding format of DCI 622 indicates 2, HARQ-ACK information for the corresponding DCI 622 may be transmitted to a PUCCH 623 of a slot n+2. Here, as if assuming that a predetermined SPS PDSCH is scheduled in the slot n, the UE maps and transmits the HARQ-ACK information for the DCI 622 indicating DL SPS release in the position of the HARQ-ACK codebook corresponding to the assumed SPS PDSCH. In this regard, the following two methods are possible, and the base station and the UE may transmit and receive the corresponding DCI in at least one method according to the standard or the base station configuration.

Method 1-1-1: Transmit DCI indicating DL SPS release only in slot in which predetermined SPS PDSCH is to be transmitted For example, as in reference numeral 620 of FIG. 6A, when the SPS PDSCH is configured to be transmitted in the slot n, the UE transmits the DCI 622 indicating release of the SPS PDSCH only in the slot n, and the slot in which the HARQ-ACK information is transmitted has the same as the determined slot location when it is assumed that the SPS PDSCH is transmitted. In other words, when the slot in which the HARQ-ACK information for the SPS PDSCH is transmitted is n+2, the slot in which the HARQ-ACK information for the DCI indicating release of the DL SPS PDSCH is transmitted is also n+2.

Method 1-1-2: Transmit DCI indicating DL SPS release in arbitrary slot regardless of the slot in which the SPS PDSCH is transmitted.

For example, as in reference numeral 620 of FIG. 6A, assuming that the SPS PDSCH is transmitted in slots n, n+10, n+20, . . . , the base station transmits a DCI 624 indicating release of the corresponding DL SPS PDSCH in the slot n+3. Here, when the value indicated in the PDSCH to HARQ-ACK feedback timing indicator included in the corresponding DCI is 1 or there is no corresponding field, or when the value previously configured as the higher signal is 1, HARQ-ACK information 626 for DCI indicating DL SPS PDSCH release is transmitted/received in the slot n+4.

In addition, there may be a case in which the minimum period of the DL SPS is shorter than 10 ms. For example, when there is data in which different equipment in a factory wirelessly requires high reliability and low latency and the transmission period of the data is constant and the period itself is short, the transmission period should be shorter than the current minimum period of 10 ms. Accordingly, the DL SPS transmission period may be determined in units of slots, symbols, or symbol groups, regardless of subcarrier intervals other than ms.

For reference, the minimum transmission period of the uplink configured grant PUSCH resource is 2 symbols.

Figure 6B:
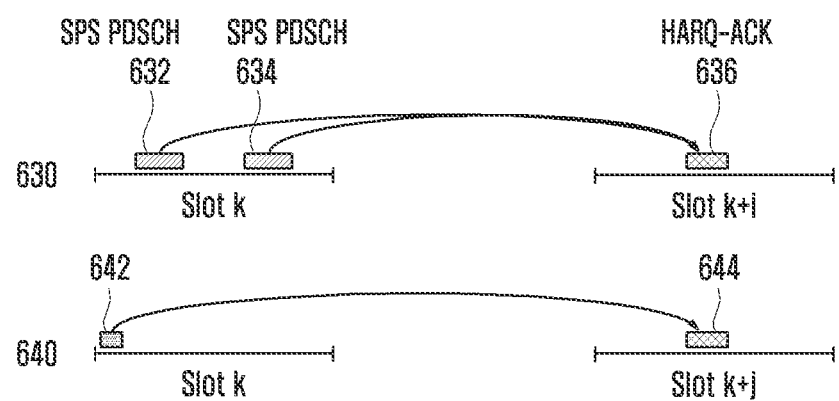
FIG. 6B is a diagram illustrating another example of a HARQ-ACK transmission process for a DL SPS according to an embodiment of the disclosure.

FIG. 6B is a diagram illustrating another example of a HARQ-ACK transmission process for a DL SPS according to an embodiment of the disclosure.

Referring to FIG. 6B, reference numeral 630 of FIG. 6B shows a situation in which the transmission period of the DL SPS is 7 symbols smaller than the corresponding slot. Since the transmission period is within one slot, a maximum of two SPS PDSCHs 632 and 634 may be transmitted in a slot k. When there is no value or a corresponding field indicated by the PDSCH to HARQ-ACK feedback timing indicator included in the DCI indicating SPS activation, HARQ-ACK information corresponding to the SPS PDSCH 632 and the SPS PDSCH 634 is transmitted in a slot according to a value previously configured as a higher signal. For example, when the corresponding value is i, the UE transmits HARQ-ACK information 636 for the SPS PDSCH 632 and the SPS PDSCH 634 in a slot k+i.

The position of the HARQ-ACK information on the HARQ-ACK codebook should be obtained by considering the transmission period as well as TDRA, which is the time resource information for which the SPS PDSCH is scheduled. In the prior art, since only one SPS PDSCH could be transmitted per slot, the position of the HARQ-ACK codebook was determined based on TDRA, which is time resource information, without considering the transmission period. However, when the DL SPS transmission period is smaller than the slot, the TDRA and the transmission period, which are time resource information, should be considered together in order to determine the position of the HARQ-ACK codebook. Here, the TDRA is time domain resource allocation, and includes transmission starting symbol and length information of the SPS PDSCH. For example, when the DL SPS transmission period is 7 symbols, the starting symbol of the DL SPS PDSCH determined by TDRA is 2, and the length is 3, two DL SPS PDSCHs may exist in one slot as reference numeral 630 of FIG. 6B. That is, the first SPS PDSCH 632 is a PDSCH having OFDM symbol indexes 2, 3, and 4 determined in the TDRA, and the second SPS PDSCH 634 is a PDSCH having OFDM symbol indexes 9, 10, and 11 in consideration of the TDRA and the transmission period of 7 symbols. That is, the second SPS PDSCH in the slot has the same length as the first SPS PDSCH, but the offset is shifted by the transmission period. In summary, in order to determine the position of the HARQ-ACK codebook for SPS PDSCH in one slot, the UE uses time resource allocation information for generation and determination of quasi-static HARQ-ACK codebook when the SPS PDSCH transmission period is greater than one slot, or considers the time resource allocation information and the SPS PDSCH transmission period together when the SPS PDSCH transmission period is less than one slot.

Figure 6C:
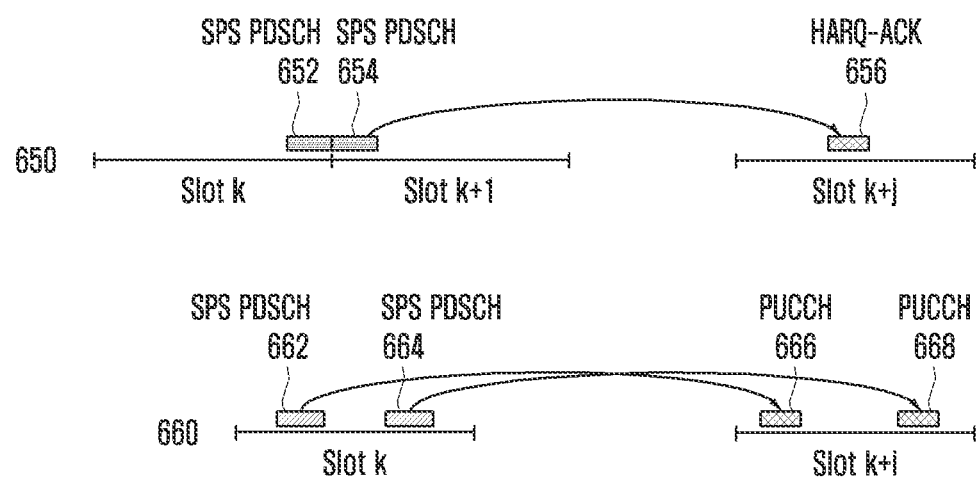
FIG. 6C is a diagram illustrating another example of a HARQ-ACK transmission process for a DL SPS according to an embodiment of the disclosure.

When the SPS PDSCH transmission period is less than one slot, the case where the SPS PDSCH extends a slot boundary may occur according to a combination of the transmission period and the TDRA. FIG. 6C is a diagram illustrating another example of a HARQ-ACK transmission process for a DL SPS according to an embodiment of the disclosure.

Referring to FIG. 6C, reference numeral 650 of FIG. 6C shows the corresponding example. In this case, the base station configures in a manner that one SPS PDSCH out of the slot boundary is divided into a PDSCH 652 and a PDSCH 654 for repeated transmission. In this case, the PDSCH 652 and the PDSCH 654 may always have the same length or different lengths. In addition, only one HARQ-ACK information 656 for the SPS PDSCH composed of the PDSCH 652 and the PDSCH 654 is transmitted by the UE, and the corresponding reference slot is based on a slot k+1 to which the last repeatedly transmitted PDSCH 654 has been transmitted.

Embodiment 1-1: Method of Mapping Semi-Static HARQ-ACK Codebook for DCI Indicating DL SPS Release In a case in which the transmission period of the SPS PDSCH becomes smaller than one slot, when the UE transmits HARQ-ACK information for DCI requesting release of the corresponding SPS PDSCH based on the semi-static HARQ-ACK codebook, the UE maps the HARQ-ACK codebook for the corresponding DCI by at least one of the following methods.

Method 1-2-1: The position on the semi-static HARQ-ACK codebook for HARQ-ACK information for DCI indicating the release of SPS PDSCH is the same as the position on the HARQ-ACK codebook for the first SPS PDSCH from the time resource point of view among SPS PDSCHs received in one slot.

When the number of SPS PDSCHs in the slot in which the DCI indicating the release of the SPS PDSCH is transmitted is two or more, the UE maps HARQ-ACK information for the corresponding DCI to the position of the semi-static HARQ-ACK codebook for the HARQ-ACK information of the first SPS PDSCH in time and transmits the resultant information.

For example, when the maximum number of PDSCHs that can be transmitted and received without simultaneous PDSCH reception including the SPS PDSCH in the slot in which the DCI indicating the release of the SPS PDSCH is to be transmitted is 4, the size of the HARQ-ACK codebook for the corresponding slot is 4, and HARQ-ACK information for SPS PDSCH or PDSCH reception may be mapped to each position as {1, 2, 3, 4}. When it is assumed that two SPS PDSCHs exist at positions {2} and {3}, respectively, the HARQ-ACK information indicating release of DL SPS PDSCH is mapped to position {2} among positions in the HARQ-ACK codebook of HARQ-ACK information corresponding to positions {2} and {3}.

Method 1-2-2: The position of the semi-static HARQ-ACK codebook for HARQ-ACK information for DCI indicating the release of the SPS PDSCH is the same as the position of the HARQ-ACK codebook for the SPS PDSCH located last in terms of time resources among the SPS PDSCHs received in one slot.

When the number of SPS PDSCHs in the slot in which the DCI indicating the release of SPS PDSCH is transmitted is two or more, the UE maps HARQ-ACK information for the corresponding DCI to the position of the semi-static HARQ-ACK codebook for HARQ-ACK information of the temporally last SPS PDSCH and transmits the resultant information.

For example, when the maximum number of PDSCHs that can be transmitted and received without simultaneous PDSCH reception while including the SPS PDSCH in the slot in which the DCI indicating the release of SPS PDSCH is to be transmitted is 4, the size of the HARQ-ACK codebook for the corresponding slot is 4, and HARQ-ACK information for SPS PDSCH or PDSCH reception may be mapped to each position as {1, 2, 3, 4}. When it is assumed that two SPS PDSCHs exist at positions {2} and {3}, respectively, the HARQ-ACK information indicating the release of DL SPS PDSCH is mapped to position {3} among positions in the HARQ-ACK codebook of HARQ-ACK information corresponding to positions {2} and {3}.

Method 1-2-3: The positions of the semi-static HARQ-ACK codebook for HARQ-ACK information for DCI indicating the release of SPS PDSCH are the same as the positions of all HARQ-ACK codebooks for SPS PDSCHs received within one slot.

When the number of SPS PDSCHs in the slot in which the DCI indicating the release of SPS PDSCH is transmitted is two or more, the UE repeatedly maps HARQ-ACK information for the corresponding DCI to the positions of the semi-static HARQ-ACK codebook for HARQ-ACK information of all SPS PDSCHs and transmits the resultant information.

For example, when the maximum number of PDSCHs that can be transmitted and received without simultaneous PDSCH reception while including the SPS PDSCH in the slot in which the DCI indicating the release of SPS PDSCH is to be transmitted is 4, the size of the HARQ-ACK codebook for the corresponding slot is 4, and HARQ-ACK information for SPS PDSCH or PDSCH reception may be mapped to each position as {1, 2, 3, 4}. When it is assumed that two SPS PDSCHs exist at positions {2} and {3}, respectively, HARQ-ACK information indicating the release of DL SPS PDSCH is repeatedly mapped to positions {2} and {3}. That is, the same HARQ-ACK information is mapped to positions {2} and {3}.

Method 1-2-4: The position of the semi-static HARQ-ACK codebook for HARQ-ACK information for DCI indicating the release of SPS PDSCH is selected based on a higher signal, a signal L1, or a combination thereof configured by the base station as one of multiple HARQ-ACK codebook candidate positions for SPS PDSCHs received within one slot.

When the number of SPS PDSCHs in the slot in which the DCI indicating the release of the SPS PDSCH is transmitted is two or more, the base station selects one position based on a higher signal, a signal L1, or a combination thereof among the positions of the semi-static HARQ-ACK codebook for the HARQ-ACK information of the SPS PDSCHs, and the UE maps HARQ-ACK information for the corresponding DCI to the selected position and transmits the resultant information.

For example, when the maximum number of PDSCHs that can be transmitted and received without simultaneous PDSCH reception while including the SPS PDSCH in the slot in which the DCI indicating the release of the SPS PDSCH is to be transmitted is 4, the size of the HARQ-ACK codebook for the corresponding slot is 4, and HARQ-ACK information for SPS PDSCH or PDSCH reception may be mapped to each position as {1, 2, 3, 4}. When it is assumed that two SPS PDSCHs exist at positions {2} and {3}, respectively, the base station selects {2} by using the DCI indicating the release of DL SPS PDSCH, and the UE maps HARQ-ACK information indicating the release of the DL SPS PDSCH to position {2} and transmits the resultant information. As a DCI field for determining the position of the semi-static HARQ-ACK codebook, a time resource allocation field, a HARQ process number, or a PDSCH-to-HARQ feedback timing indicator may be utilized. For example, a time resource allocation field in DCI indicating release of SPS PDSCH indicates time resource information of one SPS PDSCH among SPS PDSCHs that can be transmitted in the corresponding slot, the UE may transmit HARQ-ACK information of the corresponding DCI to the position of the semi-static HARQ-ACK codebook corresponding to the indicated SPS PDSCH.

Method 1-2-5: The position of the semi-static HARQ-ACK codebook for the HARQ-ACK information for DCI indicating the release of the SPS PDSCH is indicated or configured by the base station by the higher signal, the signal L1, or the combination thereof. When the number of maximum receivable PDSCHs without time overlap in the slot in which the DCI indicating release of the SPS PDSCH is transmitted is two or more, the base station selects one position among the positions of the semi-static HARQ-ACK codebook for HARQ-ACK information of the corresponding PDSCHs as the higher signal, the signal L1, or the combination thereof, and the UE maps HARQ-ACK information for the corresponding DCI to the selected position and transmits the resultant information.

A set of the semi-static HARQ-ACK codebook positions selectable by the base station by method 1-2-4 is composed of semi-static HARQ-ACK codebook positions to which HARQ-ACK information of the SPS PDSCH can be mapped, and a set of semi-static HARQ-ACK codebook positions selectable by the base station by method 1-2-5 is composed of semi-static HARQ-ACK codebook positions to which HARQ-ACK information of all PDSCHs can be mapped. For example, when the maximum number of PDSCHs that can be transmitted and received without simultaneous PDSCH reception while including SPS PDSCH in a slot in which DCI indicating release of SPS PDSCH is to be transmitted is 4, assuming that two SPS PDSCHs exist at positions {2} and {3}, respectively, candidate positions where HARQ-ACK for DCI indicating SPS PDSCH release can be transmitted are {2}, {3} according to method 1-2-4, and {1}, {2}, {3}, {4} according to method 1-2-5.

For example, when the maximum number of PDSCHs that can be transmitted and received without simultaneous PDSCH reception while including the SPS PDSCH in the slot in which the DCI indicating the release of the SPS PDSCH is to be transmitted is 4, the size of the HARQ-ACK codebook for the corresponding slot is 4, and HARQ-ACK information for SPS PDSCH or PDSCH reception may be mapped to each position as {1, 2, 3, 4}. The base station selects {1} using DCI indicating release of the DL SPS PDSCH, and the UE maps HARQ-ACK information indicating the release of the DL SPS PDSCH to position {1} and transmits the resultant information. As a DCI field for determining the semi-static HARQ-ACK codebook position, a time resource allocation field, a HARQ process number, or a PDSCH-to-HARQ feedback timing indicator may be utilized. For example, a time resource allocation field in DCI indicating the release of SPS PDSCH indicates time resource information of one PDSCH among PDSCHs that can be transmitted in a corresponding slot, and the UE transmits HARQ-ACK information of the corresponding DCI to the semi-static HARQ-ACK codebook position corresponding to the indicated PDSCH.

The above-described methods will be possible in a situation in which only one HARQ-ACK transmission is supported in one slot. When a code block group (CBG)-based transmission is configured to the higher through the DL SPS PDSCH, the UE may repeat HARQ-ACK information for DCI indicating the release of the DL SPS PDSCH by the number of CBGs, may map the repeated HARQ-ACK information to a semi-static HARQ-ACK codebook resource determined by at least one of the above methods, and may transmit the resultant information. Although the above-described method has been described as a method of transmitting HARQ-ACK information for the DL SPS PDSCH indicating release of one SPS PDSCH transmission/reception, the above-described method can be applied to a method of transmitting HARQ-ACK information for a DL SPS PDSCH indicating simultaneous release of two or more activated PDSCH transmission/reception in one cell or/and one BWP. As an example, when DCI indicating release of one DL SPS PDSCH is related to a plurality of SPS PDSCHs activated in one cell or/and one BWP, SPS PDSCHs considered for HARQ-ACK codebook positioning may belong to one SPS configuration or may be SPS PDSCHs belonging to all configurations. At this time, when the SPS PDSCHs considered in the one SPS configuration belong, the one SPS configuration may be SPS configuration having the lowest SPS PDSCH configuration number (or an SPS index or an SPS configuration identifier) or an SPS configuration activated first. This is only an example, and other similar methods may be sufficiently possible.

Embodiment 1-2: Dynamic HARQ-ACK Codebook Mapping Method for Multiple SPS PDSCHs Transmitted in One Slot In the dynamic HARQ-ACK codebook (or Type 2 HARQ-ACK codebook), the position of corresponding HARQ-ACK information is basically determined by total DAI and counter DAI included in DCI for scheduling PDSCH. The total DAI informs the size of the HARQ-ACK codebook transmitted in the slot n, and the counter DAI informs the position of the HARQ-ACK codebook transmitted in the slot n. Next, the dynamic HARQ-ACK codebook in Rel-15 NR is configured by pseudo-code 3.

Start Pseudo-Code 3

If the UE transmits HARQ-ACK information in a PUCCH in slot n and for any PUCCH format, the UE determines the $\widetilde{o}_0 ACK$, $\widetilde{o}_1^{ACK}$, ..., $\widetilde{o}_{o^{ACK}-1}^{ACK}$, for a total number of $O_{ACK}$ HARQ-ACK information bits, according to the following pseudo-code:

Set m=0 - PDCCH with DCI format 1_0 or DCI format 1_1
monitoring occasion index: lower index corresponds to earlier PDCCH with DCI format 1_0 or DCI format 1_1 monitoring occasion
    Set j=0
    Set $V_{temp}$=0
    Set $V_{temp2}$=0
    Set $V_S$=Ø
    Set $N_{cells}^{DL}$ to the number of serving cells configured by higher
layers for the UE
    Set M to the number of PDCCH monitoring occasion(s)
    while m<M
        Set c=0 - serving cell index: lower indexes
correspond to lower RRC indexes of corresponding cell
        while c <$N_{cells}^{DL}$
    if PDCCH monitoring occasion m is before an active DL
BWP change on serving cell c or an active UL BWP change on the PCell and an active DL BWP change is not triggered by a DCI format 1_1 in PDCCH monitoring occasion m
        c=c+1;
        else
        if there is a PDSCH on serving cell c associated with
PDCCH in PDCCH monitoring occasion m, or there is a PDCCH indicating SPS
PDSCH release on serving cell c
            if $V_{C-DAI,c,m}^{DL} \leq V_{temp}$
            j=j+1

```
    end if
        V_temp = V_{C-DAI,c,m}^{DL}
    if V_{T-DAI,m}^{DL} = Ø
        V_temp2 = V_{C-DAI,c,m}^{DL}
    else
        V_temp2 = V_{T-DAI,m}^{DL}
    end if
    if harq-ACK-SpatialBundlingPUCCH is not
provided and m is a monitoring occasion for PDCCH with DCI format 1_0 or DCI
format 1_1 and the UE is configured by maxNrofCodeWordsScheduledByDCI with
reception of two transport blocks for at least one configured DL BWP of at least one
serving cell,
        õ_{8 j+2(V_{C-DAI,c,m}^{DL}-1)}^{ACK} = HARQ-ACK
information bit corresponding to the first transport block of this cell
        õ_{8 j+2(V_{C-DAI,c,m}^{DL}-1)+1}^{ACK} = HARQ-ACK
information bit corresponding to the second transport block of this cell
        V_s = V_s ∪ {8 j + 2(V_{C-DAI,c,m}^{DL} -1), 8 j + 2(V_{C-DAI,c,m}^{DL} -1)+ 1}
    elseif harq-ACK-SpatialBundlingPUCCH is
provided to the UE and m is a monitoring occasion for PDCCH with DCI format 1_1
and the UE is configured by maxNrofCodeWordsScheduledByDCI with reception of two
transport blocks in at least one configured DL BWP of a serving cell,
        õ_{4 j+V_{C-DAI,c,m}^{DL}-1}^{ACK} = binary AND operation of
the HARQ-ACK information bits corresponding to the first and second transport blocks
of this cell
        V_s = V_s ∪ {4 j + V_{C-DAI,c,m}^{DL} -1}
    else
        õ_{4 j+V_{C-DAI,c,m}^{DL}-1}^{ACK} = HARQ-ACK
information bit of this cell
        V_s = V_s ∪ {4 j + V_{C-DAI,c,m}^{DL} -1}
    end if
    end if
    c=c+1
    end if
        end while
        m=m+1
    end while
    if V_temp2 < V_temp
        j=j+1
    end if
    if harq-ACK-SpatialBundlingPUCCH is not provided to the UE
and the UE is configured by maxNrofCodeWordsScheduledByDCI with reception of two
transport blocks for at least one configured DL BWP of a serving cell,
        O^{ACK} = 2 · (4 · j + V_temp2)
    else
        O^{ACK} = 4 · j + V_temp2
    end if
    õ_i^{ACK} = NACK for any i ∈ {0,1,...,O^{ACK} - 1}\ V_s
    Set c=0
    while c < N_{cells}^{DL}
        if SPS PDSCH reception is activated for a UE
and the UE is configured to receive SPS PDSCH in a slot n-K_{1,c} for serving cell c,
where K_{1,c} is the PDSCH-to-HARQ-feedback timing value for SPS PDSCH on
serving cell c
        O^{ACK} = O^{ACK} +1
        O_{O^{ACK}-1}^{ACK} = HARQ-ACK information bit associated with
the SPS PDSCH reception
        end if
        c=c+1;
    end while
```

End Pseudo-Code 3 pseudo-code 3 is applied when the transmission period of the SPS PDSCH is greater than one slot, and when the transmission period of the SPS PDSCH is less than one slot, the dynamic HARQ-ACK codebook is determined by the following pseudo-code 4. Alternatively, pseudo-code 4 may be generally applied regardless of the SPS PDSCH transmission period or the number of SPS PDSCHs activated in one cell or/and one BWP (or one cell/one BWP).

Start Pseudo-Code 4

If the UE transmits HARQ-ACK information in a PUCCH in slot n and for any PUCCH format, the UE determines the $\tilde{o}_0, \tilde{o}_1, \ldots \tilde{o}_{O_{ACK}-1}$, for a total number of $O_{ACK}$ HARQ-ACK information bits, according to the following pseudo-code:

```
Set m=0 - PDCCH with DCI format 1_0 or DCI format 1_1
monitoring occasion index: lower index corresponds to earlier PDCCH with DCI format
1_0 or DCI format 1_1 monitoring occasion
Set j=0
Set V_temp=0
```

-continued

```
    Set V_temp2=0
    Set V_s=Ø
    Set N_cells^DL to the number of serving cells configured by higher
layers for the UE
    Set M to the number of PDCCH monitoring occasion(s)
    while m<M
        Set c=0 - serving cell index: lower indexes
correspond to lower RRC indexes of corresponding cell
        while c < N_cells^DL
            if PDCCH monitoring occasion m is before an active DL
BWP change on serving cell c or an active UL BWP change on the PCell and an active
DL BWP change is not triggered by a DCI format 1_1 in PDCCH monitoring occasion
m
            c=c+1;
        else
            if there is a PDSCH on serving cell c associated with
PDCCH in PDCCH monitoring occasion m, or there is a PDCCH indicating SPS
PDSCH release on serving cell c
``` if $V_{C\text{-}DAI,c,m}^{DL} \leq V_{temp}$
  j=j+1
end if
$V_{temp} = V_{C\text{-}DAI,c,m}^{DL}$
if $V_{T\text{-}DAI,m}^{DL} = \emptyset$
$V_{temp2} = V_{C\text{-}DAI,c,m}^{DL}$
else
$V_{temp\,2} = V_{T\text{-}DAI,m}^{DL}$
end if
  if harq-ACK-SpatialBundlingPUCCH is not
provided and m is a monitoring occasion for PDCCH with DCI format 1_0 or DCI
format 1_1 and the UE is configured by maxNrofCodeWordsScheduledByDCI with
reception of two transport blocks for at least one configured DL BWP of at least one
serving cell,
  $\tilde{o}_{8j+2(V_{C\text{-}DAI,c,m}^{DL}-1)}$ = HARQ-ACK
information bit corresponding to the first transport block of this cell
  $\tilde{o}_{8j+2(V_{C\text{-}DAI,c,m}^{DL}-1)+1}$ = HARQ-ACK
information bit corresponding to the second transport block of this cell
  $V_s = V_s \cup \{8j + 2(V_{C\text{-}DAI,c,m}^{DL}-1), 8j + 2(V_{C\text{-}DAI,c,m}^{DL}-1)+1\}$
    elseif harq-ACK-SpatialBundlingPUCCH is
provided to the UE and m is a monitoring occasion for PDCCH with DCI format 1_1
and the UE is configured by maxNrofCodeWordsScheduledByDCI with reception of two
transport blocks in at least one configured DL BWP of a serving cell,
  $\tilde{o}_{8j+2(V_{C\text{-}DAI,c,m}^{DL}-1}$ = binary AND operation of
the HARQ-ACK information bits corresponding to the first and second transport blocks
of this cell
  $V_s = V_s \cup \{4j+V_{C\text{-}DAI,c,m}^{DL}-1\}$
    else
  $\tilde{o}_{4j+V_{C\text{-}DAI,c,m}^{DL}-1}^{ACK}$ = HARQ-ACK
information bit of this cell
  $V_s = V_s \cup \{4j+V_{C\text{-}DAI,c,m}^{DL}-1\}$
      end if
    end if
    c=c+1
  end if
  end while
  m=m+1
end while
if $V_{temp2} < V_{temp}$
  j=j+1
end if
if harq-ACK-SpatialBundlingPUCCH is not provided to the UE
and the UE is configured by maxNrofCodeWordsScheduledByDCI with reception of two
transport blocks for at least one configured DL BWP of a serving cell,
  $O^{ACK} = 2 \cdot (4 \cdot j + V_{temp2})$
else
  $O^{ACK} = 4 \cdot j + V_{temp2}$
end if
$\tilde{o}_i^{ACK}$ =NACK for any $i \in \{0,1,...,O^{ACK}-1\}\backslash V_s$
Set c=0
  while c < $N_{cells}^{DL}$
    if SPS PDSCH reception is activated for a UE and
the UE is configured to receive multiple SPS PDSCHs in a slot n=$K_{1,c}$ for serving cell
c, where $K_{1,c}$ is the PDSCH-to-HARQ-feedback timing value for SPS PDSCH on
serving cell c $O^{ACK} = O^{ACK}$ + k where k is the number of multiple SPS
PDSCHs in a slot n-$K_{1,c}$
    $O_{O^{ACK}-1}{}^{ACK}$ = HARQ-ACK information bit associated with the
SPS PDSCH reception
    end if
    c=c+1;
    end while End Pseudo-Code 4

In the above-mentioned pseudo-code 4, a value of k, which is the number of SPS PDSCHs in one slot, corresponds only to one SPS PDSCH configuration in one cell/one BWP, or may include all SPS PDSCH configurations when it is possible to configure multiple SPS PDSCHs within one cell or/and one BWP.

The pseudo-code 3 or pseudo-code 4 may be applied in a situation where HARQ-ACK information transmission is limited to at most one per slot.

Embodiment 1-3: Individual HARQ-ACK Transmission Method for Multiple SPS PDSCHs Transmitted in One Slot When the UE receives, from the base station, configuration of a DL SPS transmission period smaller than one slot as a higher signal to transmit only one HARQ-ACK per slot, the UE transmits HARQ-ACK information on the DL SPS PDSCH 632 and DL SPS PDSCH 634 received in the slot k as in 630 of FIG. 6B to the PUCCH of a slot k+i indicated in advance by a higher signal, a signal L1, or a combination thereof. For example, the UE determines granularity for the PDSCH to HARQ-ACK feedback timing indicator in the DCI format indicating DL SPS activation to be a slot level, the base station provides, to the UE, a difference value between a slot index in which the DL SPS PDSCH is received and a slot index in which the HARQ-ACK information is transmitted, and a PUCCH resource through which HARQ-ACK information is transmitted in the slot indicated by L1 is configured to the UE as a higher signal. Reference numeral 630 of FIG. 6B shows a situation in which the PDSCH to HARQ-ACK feedback timing indicator indicates a value of i. The corresponding value may be directly selected as the signal SL, or candidate values may be configured as the higher signal, and one of these values may be selected as the signal L1.

When the UE or the base station wants to separately transmit and receive HARQ-ACK information for DL SPS PDSCHs that are individually transmitted and received, the base station may configure to transmit two or more HARQ-ACKs per slot as a higher signal at the DL SPS transmission period less than one slot. For example, as in 660 of FIG. 6C, the UE transmits HARQ-ACK information for the SPS PDSCH 662 received in the slot k through a PUCCH 666 in the slot k+i, and HARQ-ACK information for a SPS PDSCH 664 may be transmitted through a PUCCH 668 in the slot k+i. To enable this, as an example, the UE determines the granularity for the PDSCH to HARQ-ACK feedback timing indicator in the DCI format indicating DL SPS activation as the symbol level, and the corresponding value may mean a total symbol length from a transmission ending symbol (or transmission starting symbol) of the SPS PDSCH to a transmission starting symbol (or transmission ending symbol) of the PUCCH in which the corresponding HARQ-ACK information is transmitted.

In 660 of FIG. 6C, when the ending symbol of the SPS PDSCH 662 is s0 and the starting symbol of the PUCCH 666 through which HARQ-ACK information for the SPS PDSCH 662 is transmitted is s1, the value indicated by the PDSCH to HARQ-ACK timing indicator may be "s1-s0", and this value is directly selected by the signal L1 or candidate values are configured as the higher signal. Here, one of these values is determined as the signal L1. Through the information, the UE can determine the starting symbol of the PUCCH to which the HARQ-ACK information for the SPS PDSCH is to be transmitted.

Other PUCCH transmission information may be determined as the higher signal, the signal L1, or a combination thereof. When the PUCCH resource indicator in the L1 or higher signal of Rel-15 is used, the UE may determine that a "starting symbol index" field among the values indicated by the corresponding indicator is not used. Alternatively, since the starting symbol in which the HARQ-ACK information is transmitted has already been provided through the PDSCH to HARQ-ACK feedback timing indicator information, a signal composed of a new higher signal without a corresponding field, a signal L1, or a combination thereof may be provided to the UE. In summary, the UE may differently interpret the PDSCH to HARQ-ACK feedback timing indicator field included in the DCI indicating activation of the SPS PDSCH according to the SPS PDSCH transmission period as follows.

Method 1-3-1: determine by slot level
For example, when the transmission period of the SPS PDSCH is greater than one slot, the UE determines the granularity of the PDSCH to HARQ-ACK timing feedback indicator as the slot level.

Method 1-3-2: determine by symbol level
For example, when the transmission period of the SPS PDSCH is less than one slot, the UE determines the granularity of the PDSCH to HARQ-ACK timing feedback indicator as the symbol level.

Embodiment 1-4: DL SPS or Configured Grant (CG) Period Change Method for Aperiodic Traffic The transmission period of the DL SPS supported by the base station may be a unit of a slot level or a symbol level. When information sensitive to the delay time of equipment operated in a factory is periodically generated and the period is not a value of the standard supported by the 3GPP standard organization or a multiple of the value thereof, the base station may not be able to configure an effective DL SPS transmission period. For example, if there is a traffic pattern with a 2.5 symbol interval, the base station may not be able to allocate only the DL SPS having a transmission period of 2 symbols or 3 symbols. Accordingly, there is a need to introduce a signal for configuring a DL SPS transmission period having aperiodicity or dynamically changing the transmission period. It is possible for the UE to dynamically change the transmission period by at least one of the following methods.

Method 1-4-1: DL SPS Transmission Period Allocation Method with Aperiodic

The base station may be able to configure the DL SPS transmission period in a bitmap manner. For example, when bitmap information composed of 10 bits exists as a higher signal and 1 indicates DL SPS transmission and 0 indicates DL SPS non-transmission, it is possible to generate the DL SPS transmission period of various patterns even not a period for 10 slots in a case in which the unit of bit means the unit of slot. In addition, the pattern may be repeated in units of 10 slots. Alternatively, a bitmap size and a section indicated by a corresponding bit may be a slot, a symbol, or a symbol group. The corresponding information may be independently configured as a higher signal, or it may be possible to vary the range of the transmission period that each bit can indicate according to the size of the bitmap. For example, when the size of the bitmap is 20, the time range indicated by each bit is 7 symbol units, and when the size of the bitmap is 10, the time range indicated by each bit may be in units of slots.

Alternatively, it is possible for the base station to configure two or more DL SPS transmission periods with a higher signal in advance, and to configure a time difference for each consecutively transmitted DL SPS as a pattern. For example, it may be possible to determine a DL SPS transmission period having a 2-symbol interval and a 3-symbol interval for a 2.5-symbol traffic pattern. The following Table 8 is a table regarding the configuration of the aperiodic DL SPS transmission period. Z is a prime number having a value of (up to) a first decimal unit, and has a relationship of X<Z<X+1. For example, when Z is 3.2, X has a value of 3. Gap 1 means a symbol interval between the first SPS PDSCH resource received by the UE and the second SPS PDSCH resource thereafter after receiving the DCI indicating SPS activation. Gap 2 means a symbol interval between the second SPS PDSCH resource and the third SPS PDSCH resource thereafter. That is, Gap i means a symbol interval between an i-th SPS PDSCH resource and an (i+1)-th SPS PDSCH resource thereafter. Configuration is a parameter for selecting one of various patterns, and Table 8 shows a configuration with a total of 9 patterns. The corresponding parameter is provided to the UE by the higher signal or the signal L1, and the UE can determine the DL SPS PDSCH transmission period pattern by the value indicated by the corresponding parameter. As another example, a value of one of the configurations may be implicitly determined according to a value of a traffic generation period. For example, when the base station and the UE transmit/receive the corresponding information by configuring a 2.3 symbol traffic pattern and the corresponding pattern by the higher signal configuration, the base station and the UE may determine that configuration 3 is applied.

TABLE 8

| Configuration | 1 | 2 | 3 | 4 | 5 | 6 | 7 | 8 | 9 |
|---|---|---|---|---|---|---|---|---|---|
| Gap 1 | X+1 | X+1 | X+1 | X+1 | X+1 | X+1 | X+1 | X+1 | X+1 |
| Gap 2 | X | X | X | X | X | X+1 | X+1 | X+1 | X+1 |
| Gap 3 | X | X | X | X+1 | X+1 | X | X+1 | X+1 | X+1 |
| Gap 4 | X | X | X+1 | X | X | X+1 | X | X+1 | X+1 |
| Gap 5 | X | X | X | X | X+1 | X | X+1 | X | X+1 |
| Gap 6 | X | X+1 | X | X+1 | X | X+1 | X+1 | X+1 | X+1 |
| Gap 7 | X | X | X+1 | X | X+1 | X+1 | X | X+1 | X+1 |
| Gap 8 | X | X | X | X+1 | X | X | X+1 | X+1 | X+1 |
| Gap 9 | X | X | X | X | X+1 | X+1 | X+1 | X+1 | X+1 |
| Gap 10 | X | X | X | X | X | X | X | X | X |

Method 1-4-2: Method of changing dynamic DL SPS transmission period

Method 1-4-2-1: including transmission period information in DCI indicating DL SPS activation A DL SPS transmission period value may be included in the DCI information. A set of transmission period candidate values is previously configured as a higher signal, and a specific value in the set may be indicated as information included in DCI. For example, when the transmission period is configured to {1 slot, 2 slots} with the higher signal, one bit of the corresponding transmission period field is included in the DCI, and the one bit indicates whether the transmission period is one slot or two slots. That is, the number of DCI bits is determined according to the set of transmission periods configured as the higher signal, and when the number of sets is N, a total of ceil(log$_2$(N)) bits are included in the DCI. The DCI corresponds to a non-fallback DCI such as DCI format 1_1, and in the case of fallback DCI such as DCI format 1_0, even if a corresponding field does not exist or exists, a fixed bit value and/or period values associated with each corresponding bit value may always be applied. For example, in the case of fallback DCI, the field indicating the transmission period may have a fixed number of bits with n bits, or/and the value of the transmission period indicated by each value of the field may be fixed.

Method 1-4-2-2: Existing field utilization 1 in DCI format indicating DL SPS activation When a field in the DCI format indicating DL SPS activation indicates a specific value, a value of another field may be used to indicate a transmission period rather than a previously indicated value. For example, when all bit values of the field indicating the HARQ process number in the DCI indicating DL SPS activation indicate a value of "1", a field informing of time resource information may be utilized for the purpose of informing of one DL SPS transmission period among a set of DL SPS transmission periods previously configured as higher signals.

Method 1-4-2-3: Existing field utilization 2 in DCI format indicating DL SPS activation In the case of DCI format indicating DL SPS activation, it may be possible that a specific field in the corresponding DCI format itself always indicates the transmission period, or that a specific value among specific fields in the corresponding DCI format indicates the transmission period. In one example, the UE—in a case in which the received DCI is verified in a format indicating SPS PDSCH activation, when the value of the time resource allocation field included in the DCI is a specific value, it is determined that the value of the time resource allocation field is used as a value indicating the transmission period of the SPS PDSCH rather than a value indicating the starting symbol and length of the existing SPS PDSCH. A mapping relationship between the specific value of the time resource allocation field and the SPS PDSCH transmission period may be configured by higher signaling or may be predetermined.

Method 1-4-2-4: Search space-based implicit transmission period information configuration A transmission period value is dynamically changed according to a search space in which DCI indicating DL SPS activation is transmitted. As an example, the DCI indicating DL SPS activation transmitted to a common search space indicates the SPS PDSCH transmission period A value, and the UE may implicitly determine that the DCI indicating the activation of the DL SPS transmitted to the UE specific search space indicates the transmission period B value.

The transmission period A and transmission period B associated with the search space may be previously configured by the UE as a higher signal.

Method 1-4-2-5: DCI format-based implicit transmission period information configuration The transmission period value is dynamically changed according to the DCI format indicating DL SPS activation. For example, the DCI indicating DL SPS activation transmitted in DCI format 1_0, which is the fallback DCI, indicates the SPS PDSCH transmission period A value, and the UE may implicitly determine that the DCI indicating activation of the DL SPS transmitted in DCI format 1_1, which is a non-fallback DCI, indicates the value of the SPS PDSCH transmission period B. The transmission period A and the transmission period B may be previously configured by the UE as a higher signal.

In the disclosure, when the transmission period of the SPS is within one slot, it is not expected for the UE to configure or receive DL SPS PDSCH time resource information having a length that exceeds the transmission period of the DL SPS. Here, when the corresponding configuration or instruction is given, the UE regards it as an error and ignores it. For example, when the transmission period of the DL SPS is 7 symbols, the UE must have the time resource length information of the DL SPS PDSCH within 7 symbols.

Figure 7:
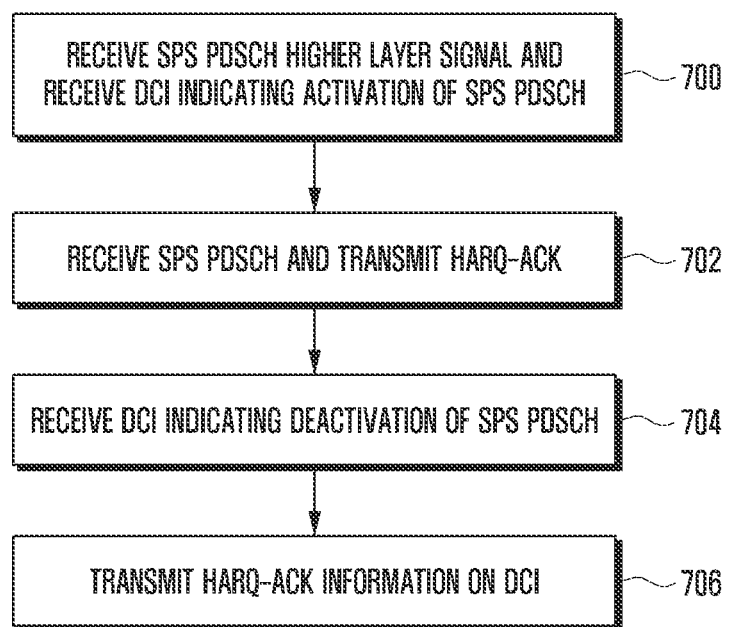
FIG. 7 is a block diagram illustrating a process in which a UE transmits semi-static HARQ-ACK codebook-based HARQ-ACK information for DCI indicating deactivation of SPS PDSCH according to an embodiment of the disclosure.

FIG. 7 is a block diagram illustrating a process in which a UE transmits semi-static HARQ-ACK codebook-based HARQ-ACK information for DCI indicating deactivation of SPS PDSCH according to an embodiment of the disclosure.

The UE receives SPS PDSCH configuration information as a higher signal. In this case, the information configured as the higher signal may include a transmission period, an MCS table, HARQ-ACK configuration information, and the like. After receiving the higher signal, the UE receives at operation 700 a DCI for activating the SPS PDSCH from the base station. After receiving the DCI indicating the activation, the UE periodically receives the SPS PDSCH and transmits at operation 702 HARQ-ACK information corresponding thereto. Thereafter, when there is no more downlink data to be periodically transmitted/received, the base station transmits a DCI indicating SPS PDSCH deactivation to the UE, and the UE receives at operation 704 the DCI.

The UE transmits at operation 706 HARQ-ACK information for DCI indicating deactivation of the SPS PDSCH according to the SPS PDSCH transmission period. For example, when the transmission period is greater than one slot, the UE transmits the HARQ-ACK information for DCI indicating deactivation of the SPS PDSCH in the position of the HARQ-ACK codebook for HARQ-ACK information corresponding to the SPS PDSCH. The HARQ-ACK information may be transmitted by at least one of the above-described method 1-1-1 or 1-1-2 of FIG. 6A. When the transmission period is less than one slot, the UE transmits the HARQ-ACK information for DCI information indicating SPS PDSCH deactivation by at least one of methods 1-2-1 to 1-2-5.

Referring to FIG. 7, the descriptions are operations applied when the UE is previously configured to use the semi-static HARQ-ACK codebook from the base station as the higher signal. In addition, the descriptions described above in FIG. 7 may be limited to a case in which the UE is configured in advance to enable only one HARQ-ACK transmission per slot with the higher signal or standard or UE capability.

Figure 8:
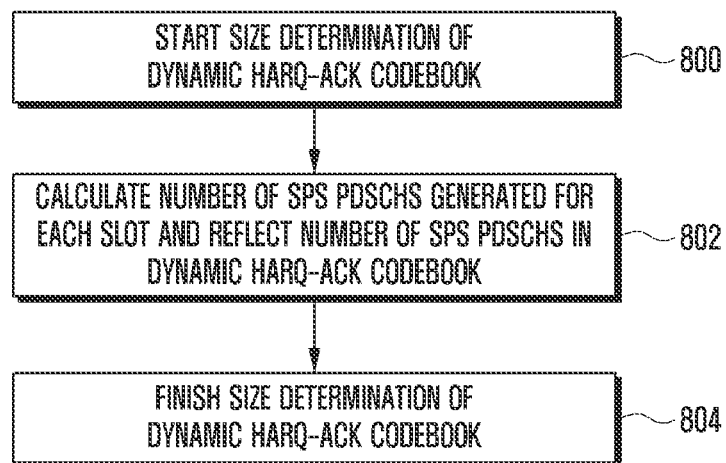
FIG. 8 is a block diagram illustrating a method for a UE to determine a dynamic HARQ-ACK codebook for SPS PDSCH reception according to an embodiment of the disclosure.

FIG. 8 is a block diagram illustrating a method for a UE to determine a dynamic HARQ-ACK codebook for SPS PDSCH reception according to an embodiment of the disclosure.

Referring to FIG. 8, when the UE is configured to operate with a dynamic HARQ-ACK codebook as a higher signal in advance, the UE starts to determine at operation 800 the size of the HARQ-ACK codebook for HARQ-ACK information to be transmitted in a specific slot. The UE not only determines the size of the HARQ-ACK codebook for the dynamically scheduled PDSCH, but also calculates the total number of SPS PDSCHs generated in the slot corresponding to the slot in which the HARQ-ACK information is to be transmitted, and reflects at operation 802 the calculated number in the size of the HARQ-ACK codebook. The UE may be able to configure the dynamic HARQ-ACK codebook by at least one of pseudo-code 3 or pseudo-code 4 described above. Thereafter, the UE terminates at operation 804 determining the size of the HARQ-ACK codebook, and transmits HARQ-ACK information in the corresponding slot.

In addition, the descriptions described above in FIG. 8 may be limited to a case in which the UE is configured in advance to enable only one HARQ-ACK transmission per slot with a higher signal or standard or UE capability. For reference, in a case in which one SPS PDSCH is repeatedly transmitted across the slot boundary like 650 in FIG. 6C, when determining the dynamic HARQ-ACK codebook, the UE determines the size of the HARQ-ACK codebook based on the last repeated transmission slot of the SPS PDSCH. Specifically, in the case of slot k in 650 of FIG. 6C, although the SPS PDSCH 652 is transmitted in a slot k, 652 is not counted as a valid number of SPS PDSCHs to determine the dynamic HARQ-ACK codebook size. Instead, the UE determines the dynamic HARQ-ACK codebook size in consideration of the SPS PDSCH 654 transmitted in a slot k+1. In addition, according to pseudo-code 4, in a case of determining the value of the number of SPS PDSCHs per slot (k) when determining the dynamic HARQ-ACK codebook size in a specific slot, the UE determines that the SPS PDSCH is valid in the slot (or the ending slot) to which the ending symbol of the last SPS PDSCH among the repeatedly transmitted SPS PDSCHs belongs.

Figure 9:
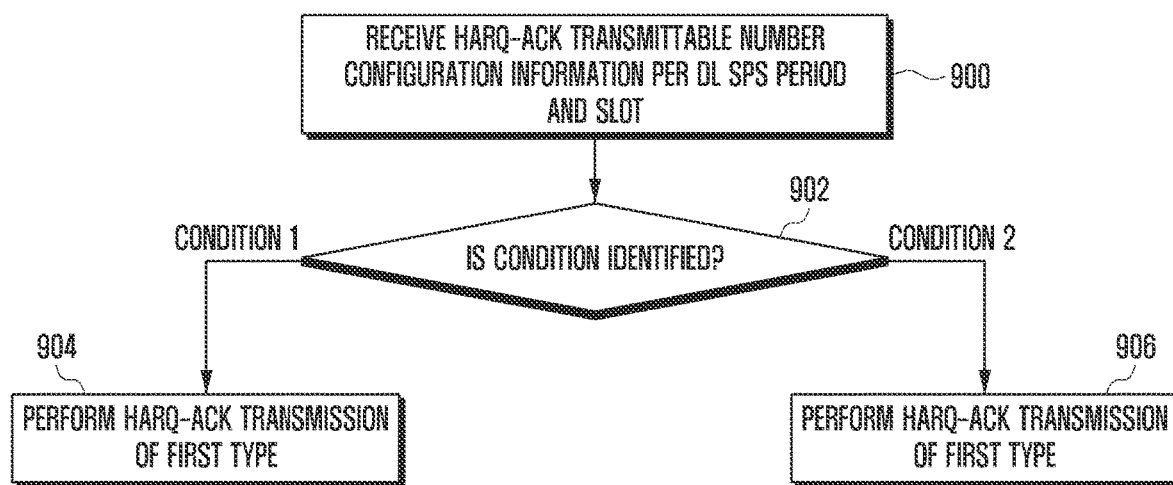
FIG. 9 is a block diagram illustrating a method of transmitting HARQ-ACK information according to a DL SPS transmission period of a UE according to an embodiment of the disclosure.

FIG. 9 is a block diagram illustrating a method of transmitting HARQ-ACK information according to a DL SPS transmission period of a UE according to an embodiment of the disclosure.

Referring to FIG. 9, the UE receives at operation 900 configuration information on the maximum number of HARQ-ACK information transmissions per DL SPS transmission period or slot provided by a higher signal or a signal L1. Then, the DL SPS transmission period and the HARQ-ACK information transmission condition per slot are checked at operation 902. When condition 1 is satisfied, the UE performs at operation 904 transmission of the first type of HARQ-ACK information. When condition 2 is satisfied, the UE performs at operation 906 the second type of HARQ-ACK information transmission. Condition 1 may be equal to at least one of the following.

When the transmission period of the DL SPS PDSCH is greater than one slot

When only one HARQ-ACK transmission is possible per slot

Condition 2 may be the same as at least one of the following.

When the transmission period of the DL SPS PDSCH is less than one slot

When two or more HARQ-ACK transmissions are possible per slot

In the case of the above-described first type HARQ-ACK information transmission, the following field is included in the DCI format indicating activation of the DL SPS PDSCH.

PDSCH to HARQ-ACK feedback timing indicator: indicates a slot in which a PDSCH is transmitted and a slot interval in which HARQ-ACK information is transmitted in units of slots. When one SPS PDSCH is repeatedly transmitted across a slot boundary as in 650 of FIG. 6C, the reference of a slot in which the PDSCH is transmitted is a slot in which the last repeatedly transmitted SPS PDSCH is located.

PUCCH resource indicator: number of symbols, starting symbol, PRB index, PUCCH format, etc. Through the above information, the UE may configure the PUCCH transmission resource and transmission format in which the HARQ-ACK information for the DL SPS PDSCH is to be transmitted. In addition, a set of values of the two field values may be configured as a higher signal in advance, and one of the values may be selected as DCI.

In the case of the above-described second type HARQ-ACK information transmission, the following field is included in the DCI format indicating activation of the DL SPS PDSCH.

PDSCH to HARQ-ACK feedback timing indicator: indicates the ending symbol of the PDSCH and the starting symbol interval at which HARQ-ACK information is transmitted in symbol units.

PUCCH resource indicator: number of symbols, PRB index, PUCCH format, etc.

Through the above information, the UE may configure the PUCCH transmission resource and transmission format in which the HARQ-ACK information for the DL SPS PDSCH will be transmitted. In addition, a set of values of the two field values may be configured as the higher signal in advance, and one of the values may be selected as DCI.

Figure 10:
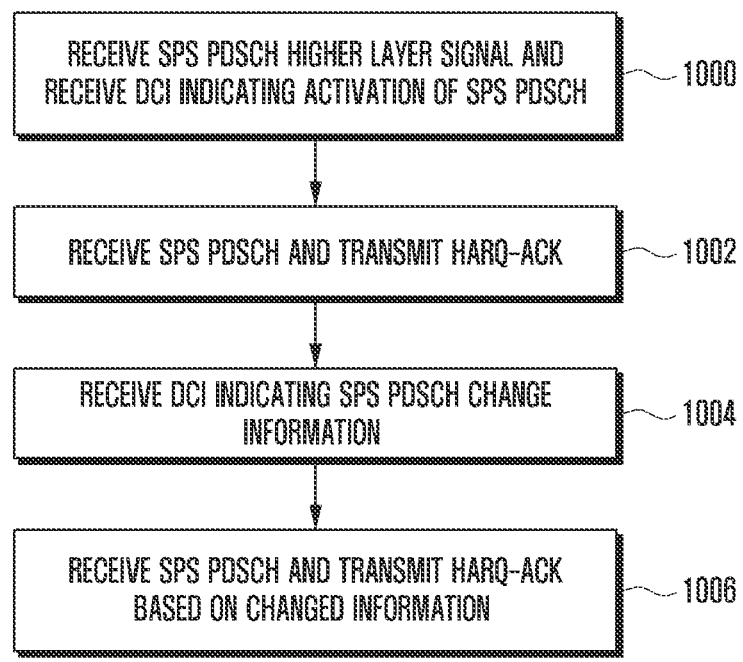
FIG. 10 is a block diagram illustrating simultaneous operation of a UE for dynamically changing a DL SPS transmission period according to an embodiment of the disclosure.

FIG. 10 is a block diagram illustrating simultaneous operation of a UE for dynamically changing a DL SPS transmission period according to an embodiment of the disclosure.

Referring to FIG. 10, the UE receives higher information on the SPS PDSCH including information such as transmission period, MCS table, and HARQ-ACK information. Next, the UE receives at operation 1000 DCI indicating activation of the SPS PDSCH. The UE then receives the SPS PDSCH and transmits at operation 1002 HARQ-ACK information corresponding thereto in a resource region determined by the higher signal and a signal L1. The UE receives at operation 1004 DCI indicating SPS PDSCH change information. Here, the change information may include an SPS PDSCH transmission period value in addition to an MCS value or a size of a frequency and time resource region. For reference, as possible methods for changing the SPS PDSCH transmission period, at least one of the methods 1-4-1 to 1-4-2 described above may be used. After receiving the DCI, the UE receives the SPS PDSCH and transmits at operation 1006 HARQ-ACK information corresponding thereto according to the changed information.

In a case in which the SPS PDSCH transmission period is changed to the higher signal or the signal L1, when the SPS PDSCH that crosses a slot boundary that may be generated according to a transmission period and a time resource region in which the SPS PDSCH is transmitted/received occurs, the UE may transmit/receive the corresponding SPS PDSCH by at least one of the following methods.

Method 2-1: Corresponding SPS PDSCH not transmitted/received

For example, when the SPS PDSCH is allocated across a slot k and a slot k+1 as in 650 of FIG. 6C, the UE considers that the SPS PDSCH allocated as described above is incorrectly configured and does not receive it, and does not transmit HARQ-ACK information corresponding thereto.

Method 2-2: Repeatedly transmission/reception by dividing corresponding SPS PDSCH based on slot boundary For example, when the SPS PDSCH is allocated across the slot k and the slot k+1 as in 650 of FIG. 6B, the UE determines that the SPS PDSCH is repeatedly received in the form of a SPS PDSCH 652 and a SPS PDSCH 654. In addition, the UE transmits only one HARQ-ACK information for this based on the last SPS PDSCH 654.

Method 2-3: Perform partial transmission/reception only in slot before slot boundary for corresponding SPS PDSCH For example, when the SPS PDSCH is allocated over the slot k and the slot k+1 as in 650 of FIG. 6C, the UE determines that a valid SPS PDSCH is allocated only to the SPS PDSCH 652, and receives the SPS PDSCH. That is, the UE and the base station do not transmit/receive on the SPS PDSCH 654. When transmitting HARQ-ACK information, the UE transmits only one based on the SPS PDSCH 652.

Method 2-4: Perform corresponding transmission and reception only for slots out of the slot boundary for that SPS PDSCH For example, when the SPS PDSCH is allocated over the slot k and the slot k+1 as in 650 of FIG. 6C, the UE determines that a valid SPS PDSCH is allocated only to the SPS PDSCH 654, and receives the SPS PDSCH. That is, the UE and the base station do not perform transmission and reception on the SPS PDSCH 652. When transmitting HARQ-ACK information, the UE transmits only one based on the SPS PDSCH 654.

Figure 11:
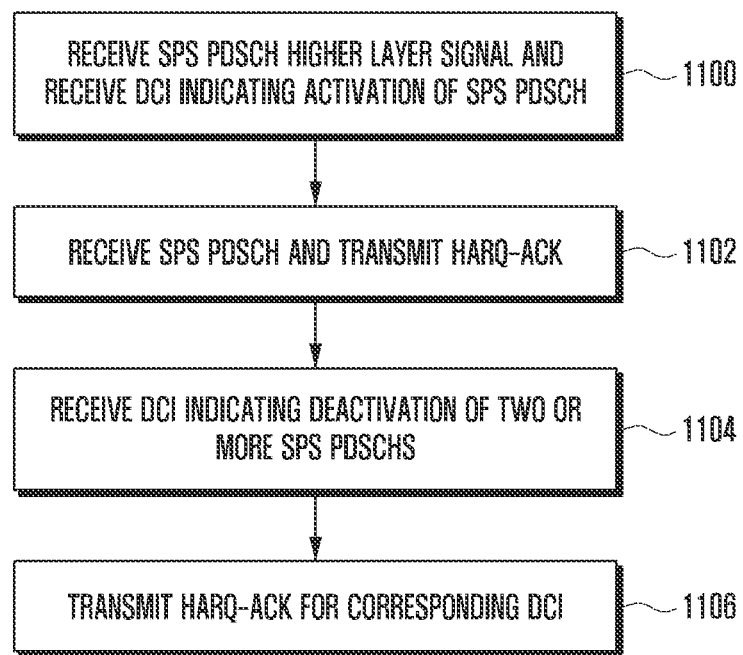
FIG. 11 is a diagram illustrating a method of transmitting HARQ-ACK information for SPS release of a UE in a situation in which two or more DL SPSs are activated according to an embodiment of the disclosure.

FIG. 11 is a UE operation diagram illustrating a method of transmitting HARQ-ACK information for SPS release of a UE in a situation in which two or more DL SPSs are activated according to an embodiment of the disclosure.

Referring to FIG. 11, when the UE can operate two or more activated DL SPS in one cell or/and one BWP, the base station may perform two or more DL SPS configurations for one UE. The reason for supporting two or more DL SPS configurations is that when the UE supports various traffic, different MCS or time/frequency resource allocation or period may be different for each traffic so that it may be advantageous to configure the DL SPS for each purpose.

The UE may receive at least some of the higher signal configuration information as shown in Table 9 for the DL SPS.

TABLE 9

- Periodicity: DL SPS transmission period
- nrofHARQ-Processes: number of HARQ processes configured for DL SPS
- n1PUCCH-AN: HARQ resource configuration information for DL SPS
- mcs-Table: MCS table configuration information applied to DL SPS
- sps-ConfigIndex-r16: Index of SPS configured in one cell/one BWP
- harq-ProcID-Offset-r16: Offset value for calculating HARQ-ACK process number
- periodicityExt-r16: As DL SPS transmission period, it can be configured to different value according to subcarrier interval. When the corresponding field exists, periodicity is ignored.
- harq-CodebookID-r16: HARQ-ACK codebook index information for SPS or SPS release
- pdsch-AggregationFactor-r16: number of SPS PDSCH repeated transmissions The SPS index among the higher signal configuration information may be utilized for the purpose of indicating which SPS DCI (L1 signaling) providing SPS activation or deactivation indicates. Specifically, in a situation where two SPSs are configured as the higher signal in one cell or/and one BWP, in order for the UE to know which of the two DCIs indicating the activation of the SPS indicates the activation of the SPS, SPS index information that informs the SPS higher information may be required. As an example, the HARQ process number field in the DCI indicating SPS activation or deactivation indicates the index of a specific SPS, and the UE may perform activation or deactivation of the SPS indicated through the HARQ process number field. Specifically, as shown in Table 10, when the DCI including the CRC scrambled with the CG-RNTI includes the following information and new data indicator (NDI) field of the DCI indicates 0, the UE may determine that the DCI indicates a specific pre-activated SPS PDSCH release (deactivation) indicated by the HARQ process number field.

TABLE 10

| DCI field | DCI format 0_0 | DCI format 1_0 |
| --- | --- | --- |
| HARQ prcess number | SPS index | SPS index |
| Redundancy version | set to '00' | set to '00' |
| Modulation and coding scheme | set to all '1's | set to all '1's |
| Frequencey domain resource assignment | set to all '1's | set to all '1's |

In Table 10, one HARQ process number may indicate one SPS index or it may be possible to indicate a plurality of SPS indexes. In addition to the HARQ process number field, one or a plurality of SPS index(s) may be indicated by other DCI fields (time resource field, frequency resource field, MCS, RV, PDSCH-to-HARQ timing field, etc.). Basically, one SPS may be activated or deactivated by one DCI.

The position of the type 1 HARQ-ACK codebook for HARQ-ACK information for DCI indicating SPS PDSCH release is the same as the position of the type 1 HARQ-ACK codebook corresponding to the reception position of the corresponding SPS PDSCH. When the position of the HARQ-ACK codebook corresponding to the candidate SPS PDSCH reception in the slot is k1, the position of the HARQ-ACK codebook for the DCI indicating the release of the corresponding SPS PDSCH is also k1. Therefore, when DCI indicating SPS PDSCH release is transmitted in the slot k, the UE does not expect to receive the PDSCH corresponding to the HARQ-ACK codebook position k1 in the same slot k, and when this situation occurs, the UE regards it as an error case.

Although DCI formats 0_0 and 1_0 are given as examples in Table 10, DCI formats 0_1 and 1_1 can be applied as well, and DCI formats 0_x and 1_x can be sufficiently extended and applied to other DCI formats 0_x and 1_x. By the above-described operation, the UE receives the DCI indicating reception of the SPS PDSCH higher signal and the activation of the SPS PDSCH, so that one or more SPS PDSCHs are simultaneously operated at operation 1100 in one cell or/and one BWP. Next, the UE periodically receives the activated SPS PDSCH in one cell or/and one BWP and transmits at operation 1102 HARQ-ACK information corresponding thereto. The UE determines the PUCCH resource to which the HARQ-ACK information corresponding to the SPS PDSCH is to be transmitted through slot interval information by the PDSCH-to-HARQ-ACK feedback timing field included in the activated DCI information, accurate time and frequency information in the corresponding slot through n1PUCCH-AN information included in the SPS higher configuration information, and PUCCH format information. When the PDSCH-to-HARQ-ACK feedback timing field included in the DCI information does not exist, the UE assumes one value previously configured as the higher signal as a default value and determines that the corresponding value is applied.

When the UE receives at operation 1104 DCI indicating deactivation of one SPS PDSCH in a situation in which the Type 1 HARQ-ACK codebook is configured, the UE determines that the position of the HARQ-ACK codebook for HARQ-ACK information for the corresponding DCI is the corresponding HARQ-ACK codebook location of the corresponding SPS PDSCH reception, and transmits the HARQ-ACK information. When deactivation of two or more SPS PDSCHs is indicated by one DCI, the UE may have a problem in which HARQ-ACK codebook position to include and transmit the HARQ-ACK information for the DCI. To solve this, the UE transmits at operation 1106 HARQ-ACK using at least one of the following methods.

Method 3-1: Comply with the position of the HARQ-ACK codebook of the SPS PDSCH according to the SPS configuration with the lowest SPS index (or the highest SPS index)

According to this method, when two or more SPS PDSCHs are deactivated by DCI indicating deactivation, HARQ-ACK information corresponding to the DCI indicating the deactivation is included by the UE in the HARQ-ACK codebook position corresponding to the SPS PDSCH reception having the smallest value (or the highest value or the middle value, etc.) among the indices of the corresponding SPS PDSCH. For example, when SPS PDSCH index 1, SPS PDSCH index 4, and SPS PDSCH index 5 are simultaneously deactivated by one DCI, the UE transmits the HARQ-ACK information for the DCI in the position of the HARQ-ACK codebook corresponding to SPS PDSCH index 1 (or 5).

Method 3-2: Include HARQ-ACK information in the earliest HARQ-ACK codebook occasion (latest HARQ-ACK codebook occasion)

According to this method, when two or more SPS PDSCHs are deactivated by DCI indicating deactivation, the UE includes HARQ-ACK information corresponding to the DCI indicating the deactivation in the earliest (or latest) HARQ-ACK codebook position among the positions of the HARQ-ACK codebook of the corresponding SPS PDSCHs. For example, in a situation where SPS PDSCH index 1, SPS PDSCH index 4, and SPS PDSCH index 5 are simultaneously deactivated by one DCI, when the HARQ-ACK codebook location corresponding to the PDSCH reception of SPS PDSCH index 1 is $k_1$, when the HARQ-ACK codebook location corresponding to the PDSCH reception of the SPS PDSCH index 2 is $k_2$, when the location of the HARQ-ACK codebook corresponding to the PDSCH reception of SPS PDSCH index 3 is $k_3$, or when $k_1<k_2<k_3$, the UE transmits the HARQ-ACK information corresponding to the DCI in $k_1$ (or $k_3$). When the positions of the HARQ-ACK codebook for PDSCH reception of two or more SPS PDSCHs are the same, the UE regards it as one and performs the above operation.

Method 3-3: All HARQ-ACK codebook occasions include HARQ-ACK information

According to this method, when two or more SPS PDSCHs are deactivated by DCI indicating deactivation, the UE includes the HARQ-ACK information for the DCI in all HARQ-ACK codebook positions and transmits the resultant information instead of selecting the HARQ-ACK codebook position according to the above-described method a-3-1 or a-3-2. For example, when SPS PDSCH index 1, SPS PDSCH index 4, and SPS PDSCH index 5 are simultaneously deactivated by one DCI, the UE transmits the HARQ-ACK information for the DCI in the HARQ-ACK codebook positions corresponding to SPS PDSCH indexes 1, 4, and 5. When at least two or more HARQ-ACK codebook positions among the SPS PDSCHs are the same, the UE regards them as one and transmits HARQ-ACK information.

As another example, in a situation where SPS PDSCH index 1, SPS PDSCH index 4, and SPS PDSCH index 5 are simultaneously deactivated by one DCI, when the HARQ-ACK codebook location corresponding to the PDSCH reception of SPS PDSCH index 1 is $k_1$, when the HARQ-ACK codebook location corresponding to the PDSCH reception of the SPS PDSCH index 2 is $k_2$, or when the location of the HARQ-ACK codebook corresponding to the PDSCH reception of SPS PDSCH index 3 is $k_3$, and when $k_1<k_2<k_3$, the UE transmits the HARQ-ACK information corresponding to the DCI in $k_1$, $k_2$, and $k_3$. When the location of the HARQ-ACK codebook for the PDSCH reception of two or more SPS PDSCHs is the same, the UE regards it as one and performs the above operation.

Method 3-4: gNB configuration

This method first means that the base station determines the above-described methods a-3-1 to a-3-3 as higher-order signals. Alternatively, secondly, in addition to the methods 3-1 to 3-3, it may be possible for the base station to directly determine the position of the HARQ-ACK codebook as a higher signal or a signal L1. At this time, when two or more SPS PDSCHs are deactivated by one DCI, the base station configures one or more HARQ-ACK codebook positions with the higher signal or the signal L1 within the candidate HARQ-ACK codebook position candidates corresponding to the inactivated SPS PDSCHs, or regardless of this, the base station may be able to determine the HARQ-ACK codebook position as the higher signal or the signal L1.

When receiving DCI indicating release or deactivation of the one or more SPS PDSCHs, the UE does not expect to receive a PDSCH scheduled by another DCI, so that the HARQ-ACK codebook position for transmitting the HARQ-ACK information for the corresponding DCI and the HARQ-ACK codebook position for transmitting the HARQ-ACK information for the PDSCH scheduled by another DCI are identical to each other. When such scheduling is received, the UE regards it as an error case and performs an arbitrary operation. For example, in this case, the UE may regard another DCI as an error and may not receive the PDSCH.

Next, an example of a signal transmission/reception scheme for a groupcast service in a wireless communication system according to various embodiments of the disclosure will be described with reference to FIG. 12.

Figure 12:
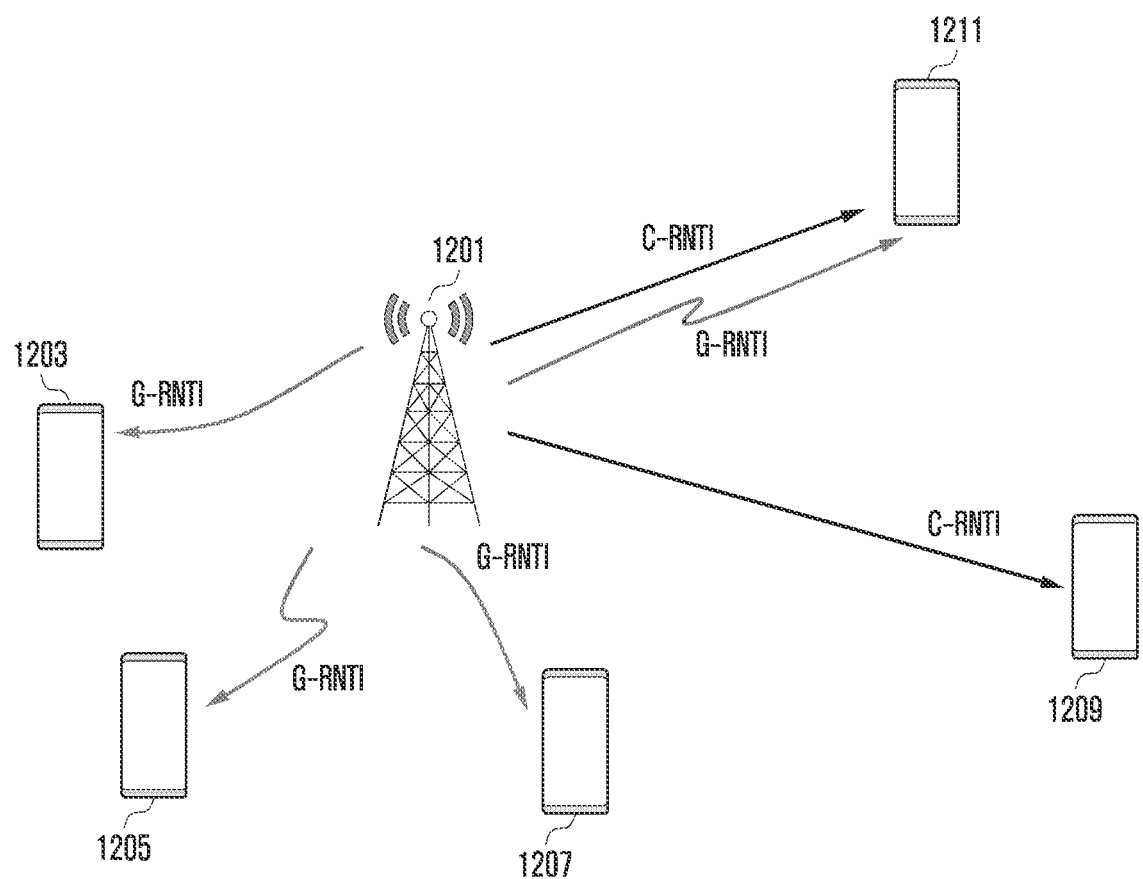
FIG. 12 is a diagram schematically illustrating an example of a signal transmission/reception scheme for a groupcast service in a wireless communication system according to an embodiment of the disclosure.

FIG. 12 is a diagram schematically illustrating an example of a signal transmission/reception scheme for a groupcast service in a wireless communication system according to an embodiment of the disclosure.

Referring to FIG. 12, an example of a groupcast in which a base station 1201 transmits the same control information and the same data to a plurality of UEs, for example, UEs 1203, 1205, 1207, and 1211 will be described. First, the base station may inform the plurality of UEs 1203, 1205, 1207, and 1211 of a system information block (SIB, hereinafter referred to as "SIB") to the UEs, or a G-RNTI that can be used to receive control information for groupcast is informed through preset information or a predetermined message. Here, the G-RNTI is a group radio network temporary identifier (G-RNTI, hereinafter referred to as "G-RNTI").

Each of the UEs 1203, 1205, 1207, and 1211 receives the G1-RNTI (or G-RNTI) transmitted from the base station 1201, and receives control information for groupcast using the G-RNTI. The G-RNTI is a cyclic redundancy check (CRC) of control information for groupcast, for example, downlink control information (DCI, hereinafter referred to as "DCI") may be scrambled and transmitted.

In FIG. 12, a UE 1209 may be a UE accessing the base station 1201, or a UE that has received a cell radio network temporary identifier (C-RNTI, hereinafter "C-RNTI") from the base station 1201. In addition, the UE 1211 may be a UE accessing the base station 1201, and may be a UE that has received a C-RNTI from the base station 1201 and also received a G-RNTI for groupcast.

Meanwhile, when the same control information and data are transmitted, and one or a plurality of UEs can receive the transmitted, the same control information and data, this may be referred to as a group cast for the control information and data. In addition, as in the UE 1209 or the UE 1211 in FIG. 12, when a C-RNTI or a UE-specific RNTI is received and only certain UEs are receiving control information and data using the C-RNTI or a UE-specific RNTI, this may be referred to as unicast for the control information and data.

Meanwhile, in various embodiments of the disclosure, the UE may be configured to receive a control channel signal and data channel signal for groupcast from a transmitting end A, and a control channel signal and a data channel signal for unicast from a transmitting end B. In various embodiments of the disclosure, the transmitting end A and the transmitting end B may be the same transmitter or different transmitters. In addition, in various embodiments of the disclosure, each of the transmitting end A and the transmitting end B may be a base station, or may be a vehicle or a general UE.

When each of the transmitting end A and the transmitting end B is a base station, groupcast data and unicast data may be transmitted from the base station, that is, transmitted through a Uu link.

Contrary to this, when each of the transmitting end A and the transmitting end B is a vehicle or a general UE, the groupcast transmission and the unicast transmission may be side link transmissions. In this case, each of the transmitting end A and the transmitting end B may be a UE operating as a leader node or an anchor node in the corresponding group so that each of the transmitting end A and the transmitting end B may perform groupcast transmission for at least one other terminal in the corresponding group, or a UE capable of receiving control information from the at least one other UE. In addition, in various embodiments of the disclosure, obviously, the transmitting end A may be a vehicle, and the transmitting end B may be a base station. In addition, various embodiments of the disclosure are described assuming that the transmitting end A and the transmitting end B are one transmitting end, but, obviously, the various embodiments of the disclosure can be applied even when the transmitting end A and the transmitting end B are different transmitting ends.

On the other hand, for reception of a control channel signal and a data channel signal for groupcast, the UE may receive an RNTI (In the following description, for the reception of a control channel signal and a data channel signal for the group cast, it should be noted that the RNTI corresponding to the unique ID may be used in combination with a G-RNTI or a group common RNTI or a Multicast and Broadcast Service (MBS)-RNTI or a group identifier) corresponding to a unique identifier (ID, hereinafter referred to as "ID") from a base station or another terminal in the group (here, another terminal in the group may be a leader node). The UE may receive a control channel signal for groupcast using the G-RNTI, and may receive a data channel signal based on the control channel signal for groupcast.

In addition, in various embodiments of the disclosure, the control channel for data scheduling can be used interchangeably with a physical downlink control channel (PDCCH: physical downlink control channel, hereinafter referred to as "PDCCH") or a physical side link control channel (PSCCH: physical side link control channel, hereinafter referred to as "PSCCH"). The data channel can be used interchangeably with a physical downlink shared channel (PDSCH: physical downlink shared channel, hereinafter referred to as "PDSCH") or a physical side link shared channel (PSSCH: physical side link shared channel, hereinafter referred to as "PSSCH"). The feedback channel can be used interchangeably with a physical uplink control channel (PUCCH, hereinafter referred to as "PUCCH") or PSCCH. In addition, in various embodiments of the disclosure, it is assumed that the control information for scheduling received by the UE is DCI as an example, but, obviously, the control information for the scheduling may be implemented in various forms other than the DCI.

In various embodiments of the disclosure, one UE transmitting the same data to a plurality of UEs or a base station transmitting the same data to a plurality of UEs may be referred to as groupcast or multicast. It should be noted that in various embodiments of the disclosure, groupcast may be used interchangeably with multicast.

In addition, in various embodiments of the disclosure, "data" may include a transport block (TB) transmitted through a shared channel such as PDSCH, PUSCH, PSSCH, and the like.

In the disclosure, an example of what is described as a higher signal may mean UE common higher signals such as MIB or SIB, or may mean UE-specific higher-order signals such as RRC or MAC CE.

In this disclosure, an example of what is described as a signal L1 may mean a specific field in DCI or DCI format information, or may mean DCI CRC and scrambled RNTI information or DCI transmission/reception control region resource information.

In the disclosure, groupcast data can be scheduled by DCI or can be subjected to semi-static-scheduling like SPS without DCI. In addition, the presence or absence of HARQ-ACK feedback for groupcast data may be notified by the higher signal or the signal L1. In addition, when HARQ-ACK feedback for group cast data is configured, the corresponding HARQ-ACK feedback type may be divided into two types. The first type transmits a NACK when data decoding fails and an ACK when data decoding succeeds. This is called a first HARQ-ACK feedback type (ACK/NACK information report). The second type is a case in which HARQ-ACK feedback is not performed when data decoding is successful and a NACK is sent only when data decoding fails, which is called a second HARQ-ACK feedback type (only NACK information is reported).

Through the first HARQ-ACK feedback type, the base station can know whether data decoding has succeeded or failed for each UE that has received groupcast data. Therefore, it is possible to retransmit the optimized group data for the failed UEs. In addition, when the UE misses the DCI for scheduling the corresponding data, the UE does not transmit whether it is ACK or NACK. This is called no detection (DTX), and the base station may perform more optimized retransmission in consideration of this. Specifically, when retransmitting data, the base station configures a data information section to be transmitted using a redundancy version (RV). When the base station re-schedules the data because the UE fails to decode the data, the base station changes the RV value, so that the decoding performance of the UE can be improved by transmitting and receiving more parity bits. On the other hand, when the UE does not receive the data itself by missing the scheduling DCI for the first data, the base station may retransmit the data with the same RV value as the first transmission. According to this method, since the HARQ-ACK feedback resource needs to be configured for each UE receiving the groupcast data, a lot of uplink resources may be required.

On the other hand, through the second HARQ-ACK feedback type, the base station can only know whether data decoding has failed for groupcast data, and may transmit NACK information through the common HARQ-ACK feedback resource usually when the UEs receiving the groupcast fail to decode the data. Accordingly, unlike the first HARQ-ACK feedback type, it is not possible to determine whether groupcast data decoding is successful for each UE. Therefore, when NACK is detected (or the detected received energy is above a specific level) through at least the HARQ-ACK feedback resource, the base station may determine that at least one terminal has failed to decode groupcast data. Accordingly, the base station retransmits the corresponding groupcast data. According to the corresponding feedback type, all or some terminals receiving groupcast data may report NACK information as a common HARQ-ACK feedback resource. Groupcast data retransmission will be possible with a small HARQ-ACK feedback resource. However, when some of the UEs miss the DCI scheduling group cast data, they will not be able to transmit HARQ-ACK information. Accordingly, when at least one UE among the UEs receiving the groupcast data does not transmit a NACK, the base station may consider that all UEs have successfully received the groupcast data. Accordingly, UEs that have missed the DCI scheduling group cast data may not be able to retransmit the corresponding data.

In a situation in which groupcast data is transmitted and received through the SPS, since there is no separate scheduling DCI, the UE receiving the groupcast data will not miss DCI reception. Accordingly, some disadvantages of the above-described second HARQ-ACK feedback type may not exist in the SPS. However, when the SPS receives the higher signal information as shown in Table 9 and receives the remaining information through DCI, activation of the SPS will be indicated by the DCI, and the UE receives data scheduled by the DCI indicating the activation of the SPS and reports the HARQ-ACK information therefor, thereby completing the activation of the SPS. Similarly, by the DCI indicating release (or deactivation) of the SPS, the UE reports HARQ-ACK information for the DCI without separate data transmission and reception, thereby completing the SPS release. When the SPS is for groupcast data transmission/reception, there is a possibility that the SPS is transmitted/received based on groupcast as DCI indicating activation and release of the SPS. Therefore, the following describes a process of transmitting and receiving groupcast data using the SPS.

Figure 13:
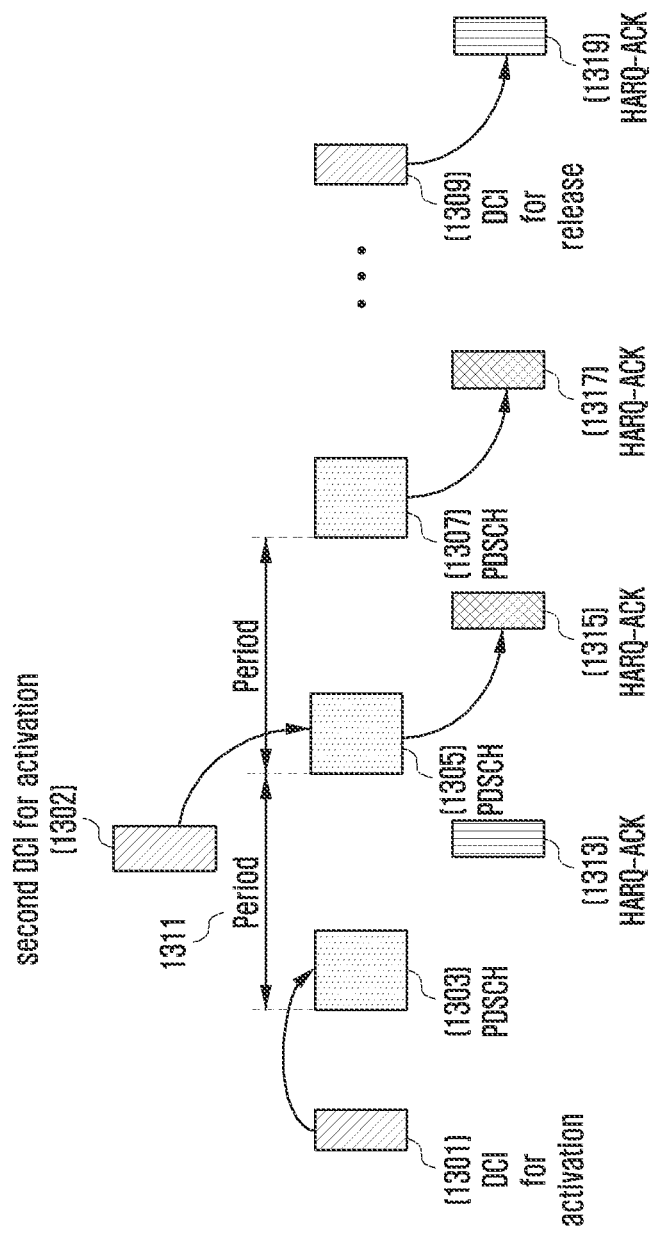
FIG. 13 is a diagram illustrating an SPS-based groupcast data transmission/reception method according to an embodiment of the disclosure.

FIG. 13 is a diagram illustrating an SPS-based groupcast data transmission/reception method according to an embodiment of the disclosure. When the SPSs described in FIGS. 3, 4, 5, 6A, 6B, 6C, 7, 8, 9, 10, and 11 were mainly SPSs for unicast data, FIG. 13 shows an SPS for groupcast data.

Referring to FIG. 13, when the SPS operation process for unicast data is applied to groupcast as it is, UEs receiving the group cast data first receive SPS higher signal information as shown in Table 9 in advance, receive DCI 1301 for activating the corresponding SPS, receive a PDSCH 1303 scheduled by the DCI, and then may report the PDSCH decoding result to the base station as a HARQ-ACK 1313. Next, the UE receiving the group cast data receives PDSCHs 1305 and 1307 without DCI scheduling at a period 1311 previously configured as the higher signal based on a slot in which the PDSCH 1303 is transmitted and received, and may report HARQ-ACKs 1315 and 1317 for this. Thereafter, the UE receiving the group cast data receives the DCI 1309 indicating release of the corresponding SPS, and reports the DCI decoding result through the HARQ-ACK 1319 scheduled by the DCI. Next, the release of the SPS may be completed.

The above description of the SPS operation corresponds to a case in which all UEs have successfully received DCI information indicating activation or release of SPS for groupcast data. When some of the UEs attempting to receive groupcast data miss DCI information indicating SPS activation or release, since the SPS operation cannot be performed correctly, the SPS operation may need to be improved in consideration of the case where the UE misses DCI information.

In addition, when the HARQ-ACKs 1313 and 1319 corresponding to the DCI 1301 or 1309 indicating SPS activation or release is the second HARQ-ACK feedback type that reports only NACK information, although it is possible to transmit and receive data using a small HARQ-ACK information resource, it is not guaranteed that all UEs have well received all of the DCI 1301 and 1309 indicating the SPS activation DCI or release. For this reason, the HARQ-ACKs 1313 and 1319 corresponding to the DCI 1301 and 1309 indicating SPS activation or release should be a first HARQ-ACK feedback type. That is, the HARQ-ACK 1313 for the groupcast data 1303 in which the corresponding DCI 1301 exists is the first feedback type, and the base station may receive ACK or NACK at 1313.

After the SPS is activated, the HARQ-ACKs 1315 and 1317 for the groupcast data 1305 and 1307 received without scheduling DCI may be the first HARQ-ACK feedback type or the second HARQ-ACK feedback type, Information indicating whether the first HARQ-ACK feedback type or the second HARQ-ACK feedback type is applied may be indicated by a specific field in the DCI that activates the SPS or may be notified by a higher-order signal. When the HARQ-ACK 1313 corresponding to the DCI 1301 indicating SPS activation is the first HARQ-ACK feedback type, the base station may determine whether the respective DCI (first DCI) has been well received by the UEs receiving the groupcast data through ACK, NACK, or DTX.

Specifically, when receiving ACK or NACK, the base station may determine that the UE has received at least the DCI (first DCI) for activating the SPS well. On the other hand, when the base station determines that the DTX is fed back, the base station may determine that the corresponding UE has not received the DCI (first DCI) for activating the SPS. Accordingly, the base station may be able to re-transmit the DCI (second DCI, 1302) indicating the SPS activation information at least again for DTX UEs. However, since there is a possibility that DCI (second DCI) information for activating SPS has an RNTI scrambled into one RNTI (G-RNTI) by all groupcast UEs, the UE that has well received DCI (first DCI) for activating the SPS may also receive the second DCI.

Therefore, it would be inefficient for the base station to configure resources other than the SPS previously activated by at least some UEs by the first DCI through the second DCI. Accordingly, it would be reasonable for the base station to activate at least one of the SPS resources 1305 and 1307 after the first SPS resource 1303 as the second DCI for UEs that have missed the first DCI. This is because, when the SPS resource 1305 is activated by the second DCI, it has the same period as the SPS resource 1303 activated by the first DCI. Accordingly, UEs that have received the first DCI and the second DCI may consider that the SPS having the same period is activated.

In the case of a UE that has received the first DCI 1301 well, the UE may receive the SPS resources 1305 and 1307 without the second DCI 1302. Accordingly, in the case of the corresponding UE, when the corresponding information is the same as that of the first DCI 1301 even if the second DCI 1302 is received, it may be possible to ignore the corresponding information. In this case, the UE may report the HARQ-ACK information 1315 and 1317 for the SPS resources 1305 and 1307 configured in advance. The corresponding HARQ-ACK feedback may be a first HARQ-ACK feedback type or a second HARQ-ACK feedback type. Alternatively, in the case of the corresponding UE, although the first DCI 1301 was well received, it may be possible to follow the information indicated by the second DCI 1302. Accordingly, the corresponding UE may receive the SPS resource region 1305 indicated by the second DCI 1302 and report HARQ-ACK information for the received information.

As another example, from the standpoint of the base station, the resource regions for HARQ-ACK information for DCI scheduled for SPS activation or release and HARQ-ACK information for other SPS PDSCHs may be the same or different from each other, and these resources may be notified to the UE in advance by the higher signal or the signal L1. In addition, in addition to the DCI scrambled by the groupcast data related RNTI (e.g., G-RNTI), the HARQ-ACK resource may be additionally configured differently for each groupcast terminal by scrambled DCI by unicast data related RNTI (e.g., C-RNTI). Accordingly, a resource region in which HARQ-ACK information 1315 for the UE that has received the second DCI 1302 is transmitted and received (that is, a HAQ-ACK resource region for whether or not the second DCI is received) and a resource region, that is, a HARQ-ACK resource region for the SPS PDSCH 1305, in which HARQ-ACK information 1315 corresponding to UEs that have received the second DCI 1302 but ignore it or receive the SPS resource 1305 without receiving the second DCI 1302 is transmitted or received may be the same or different, and may also have different HARQ-ACK feedback types.

The above-described HARQ-ACK information may mean a PUCCH or PUSCH resource through which HARQ-ACK feedback information is transmitted and received, or may mean HARQ-ACK information such as ACK/NACK/DTX itself. The HARQ-ACK information is information transmitted by the UE to the base station. The above-described SPS resource may mean a resource region in which the SPS PDSCH is transmitted/received or may be a resource region for a specific SPS index.

Similarly, when some of the UEs do not receive the corresponding DCI with respect to the DCI 1309 indicating the release of the SPS, the base station may retransmit the corresponding DCI information. Accordingly, since the UEs that missed the DCI 1309 indicating the corresponding SPS release determine that the SPS may continue to operate, the HARQ-ACK information for the previously configured SPS is not valid. However, it is preferable that the resource through which the corresponding HARQ-ACK information is transmitted and received is not used for other UEs until the SPS of all the UEs is released. When DCI 1309 indicating SPS release is transmitted as a groupcast, the UEs that have already transmitted the HARQ-ACK information 1319 for this may not transmit the HARQ-ACK information for the retransmitted DCI if the DCI indicating the same SPS release is subsequently retransmitted. This is because, since confirmation information (HARQ-ACK information) for SPS release is transmitted to the base station, the UE does not need to transmit the same information again, and thus, power consumption of the UE can be reduced.

As another example, when the DCI 1309 indicating SPS release is transmitted as a groupcast, the UEs that have already transmitted the HARQ-ACK information 1319 for the DCI may transmit, even when the DCI indicating the same SPS release is retransmitted later, the HARQ-ACK information for the DCI without ignoring the corresponding DCI. Because, even if the UE has previously transmitted the confirmation information (HARQ-ACK information) for SPS release, there is a possibility that the base station will miss it. Therefore, for the complete SPS release, when the SPS release DCI is continuously transmitted, it is necessary to transmit HARQ-ACK information.

FIG. 13 basically considers a situation in which SPS for groupcast data is activated or released by a combination of the higher signal and the signal L1, but, a case in which the SPS is configured only as a higher signal will be hereinafter described. When the SPS for groupcast is configured only to the higher signal, for the UE, in addition to Table 9, at least some of the information shown in Table 11 below should be configured as the higher signal.

TABLE 11

Carrier indicator: Indicate on which carrier data scheduled by DCI is transmitted.
Identifier for DCI formats: It indicates DCI format, and specifically, it is indicator for discriminating whether corresponding DCI is for downlink or uplink.
Bandwidth part indicator: Indicate when there is change in bandwidth part
Frequency domain resource assignment: As resource allocation information indicating frequency domain resource allocation, expressed resource varies depending on whether resource allocation type is 0 or 1
Time domain resource assignment: As resource assignment information indicating time domain resource assignment, may indicate one configuration of higher signaling or predetermined PDSCH time domain resource assignment list
VRB-to-PRB mapping: Indicates mapping relationship between virtual resource block (VRB) and physical resource block (PRB)
PRB bundling size indicator: Indicates physical resource block bundling size that the same precoding is assumed to be applied
Rate matching indicator: Indicates which rate match group is applied among rate match groups configured as higher layer applied to PDSCH
ZP CSI-RS trigger: Triggers zero power channel state information reference signal
Transport block (TB)-related configuration information: Indicates modulation and coding scheme (MCS), new data indicator (NDI) and redundancy version (RV) for one or two TBs.
Modulation and coding scheme (MCS): Indicate modulation method and coding rate used for data transmission. That is, it is possible to indicate coding rate value that can inform TBS and channel coding information together with information on whether it is QPSK, 16 QAM, 64 QAM, or 256 QAM
New data indicator: Indicates whether HARQ initial transmission or retransmission
Redundancy version: Indicates redundancy version of HARQ
HARQ process number: Indicates HARQ process number applied to PDSCH
Downlink assignment index: Index for generating dynamic HARQ-ACK codebook when reporting HARQ-ACK for PDSCH
TPC command for scheduled PUCCH: Power control information applied to PUCCH for HARQ-ACK report for PDSCH
PUCCH resource indicator: Information indicating the resource of PUCCH for HARQ-ACK report for PDSCH
PDSCH-to-HARQ_feedback timing indicator: Configuration information on which slot PUCCH for HARQ-ACK report for PDSCH is transmitted
Antenna ports: Information indicating antenna port of PDSCH DMRS and DMRS CDM group in which PDSCH is not transmitted
Transmission configuration indication: Information indicating beam related information of PDSCH
SRS request: Information requesting SRS transmission
CBG transmission information: Information indicating which code block group (CBG) data is transmitted through PDSCH when code block group-based retransmission is configured
CBG flushing out information: Information indicating whether code block group previously received by UE can be used for HARQ combining (combining)
DMRS sequence initialization: Indicate DMRS sequence initialization parameters
timeDomainOffset: Indicate offset value information of system frame number (SFN)
harq-ack-feedback: Indicate HARQ-ACK feedback presence or absence information
harq-ack-feedback type: Indicate HARQ-ACK feedback type Accordingly, the UE receives configuration of at least some pieces of the information in Table 9 and Table 11 as the higher signal, thereby periodically receiving SPS-based groupcast data without reporting HARQ-ACK information for separate SPS activation or release. The higher signal may be a UE-specific higher signal, a specific group higher signal for a groupcast UE, or a higher signal such as SIB.

Figure 14:
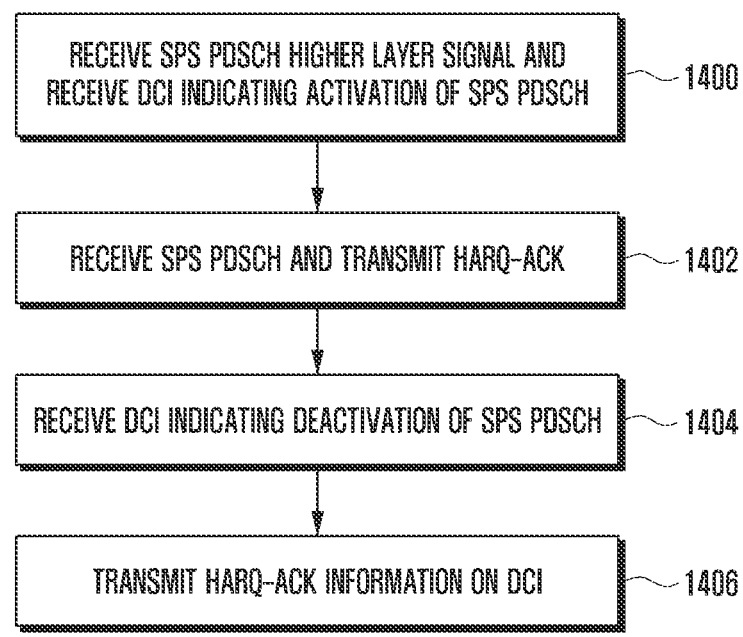
FIG. 14 is a flowchart illustrating an SPS operation method of a UE according to an embodiment of the disclosure.

FIG. 14 is a flowchart illustrating a method of operating an SPS of a UE according to an embodiment of the disclosure.

Referring to FIG. 14, the UE determines whether the corresponding SPS PDSCH is activated by DCI indicating SPS higher signal reception and SPS PDSCH activation. Information on whether the corresponding SPS PDSCH is unicast or groupcast is classified by a higher signal, or classified into RNTI scrambled to DCI indicating SPS PDSCH activation, specific bit field information in DCI, or DCI format information. The UE receives data in the SPS PDSCH resource region indicated by the scheduling DCI and transmits HARQ-ACK information at operation 1400.

At this time, when the SPS PDSCH is a groupcast as described above in FIG. 13, different HARQ-ACK feedback types may be applied depending on whether the corresponding HARQ-ACK information is HARQ-ACK information for SPS PDSCH reception indicated by scheduling DCI or HARQ-ACK information for SPS PDSCH reception periodically received without scheduling DCI. In addition, in this case, the UE may transmit HARQ-ACK information using different HARQ-ACK resources in operation 1402. The HARQ-ACK resource may be notified to the UE by the SPS higher signal or DCI indicating SPS PDSCH activation, respectively. After periodically receiving the SPS PDSCH later, the UE receives DCI indicating deactivation of the SPS PDSCH in operation 1404, and transmits HARQ-ACK information to complete the release of the SPS PDSCH in operation 1406.

As another example, when the SPS PDSCH is for groupcast data, it may be possible that the UE does not report HARQ-ACK information for the SPS PDSCH periodically received without separate DCI scheduling other than reporting HARQ-ACK information for DCI indicating SPS PDSCH activation or release, and whether such an operation is configured may be notified by the higher signal or the signal L1.

Figure 15:
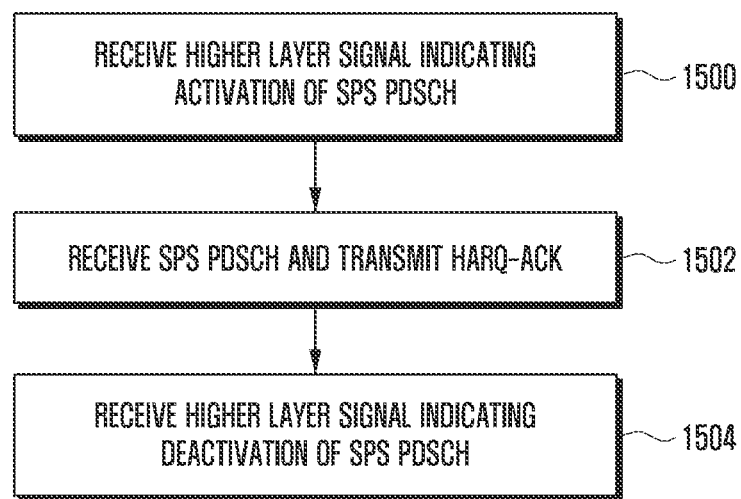
FIG. 15 is a flowchart illustrating an SPS operation method of a UE according to an embodiment of the disclosure.

FIG. 15 is a flowchart illustrating a method of operating an SPS of a UE according to an embodiment of the disclosure.

Referring to FIG. 15, when the corresponding SPS PDSCH is for groupcast data, the UE may be able to activate or release the SPS PDSCH only with a higher signal without DCI indicating separate activation or release of the SPS PDSCH. Specifically, the UE receives a higher signal indicating activation of the SPS PDSCH in operation 1500. In this case, the higher signal may be a group cast-based higher signal, a unicast-based higher signal (or a UE-specific higher signal), or a UE common higher signal such as SIB. Specifically, the group cast-based higher signal may be a higher signal that exists for the purpose of transmitting and receiving the same higher signal to and from a group of UEs for the purpose of transmitting and receiving group cast data. The UEs that have received the corresponding higher signal information may be included in the group for transmitting and receiving the same groupcast data. Thereafter, the UE may receive the SPS PDSCH for groupcast data and may transmit HARQ-ACK information in a periodic resource region designated as the higher signal in operation 1502. Alternatively, the HARQ-ACK information may or may not exist, and the presence or absence of HARQ-ACK information for the SPS PDSCH may be configured as the higher signal. In addition, the HARQ-ACK information may be a first HARQ-ACK feedback type or a second HARQ-ACK feedback type, and this feedback type may be configured as the higher signal. Afterwards, when the base station deactivates the SPS PDSCH for groupcast data transmission and reception, the higher signal indicating deactivation of the SPS PDSCH may be transmitted and received to the UEs that have received the corresponding groupcast data in operation 1504, and thereafter, the UEs may no longer receive the SPS PDSCH periodically.

Figure 16:
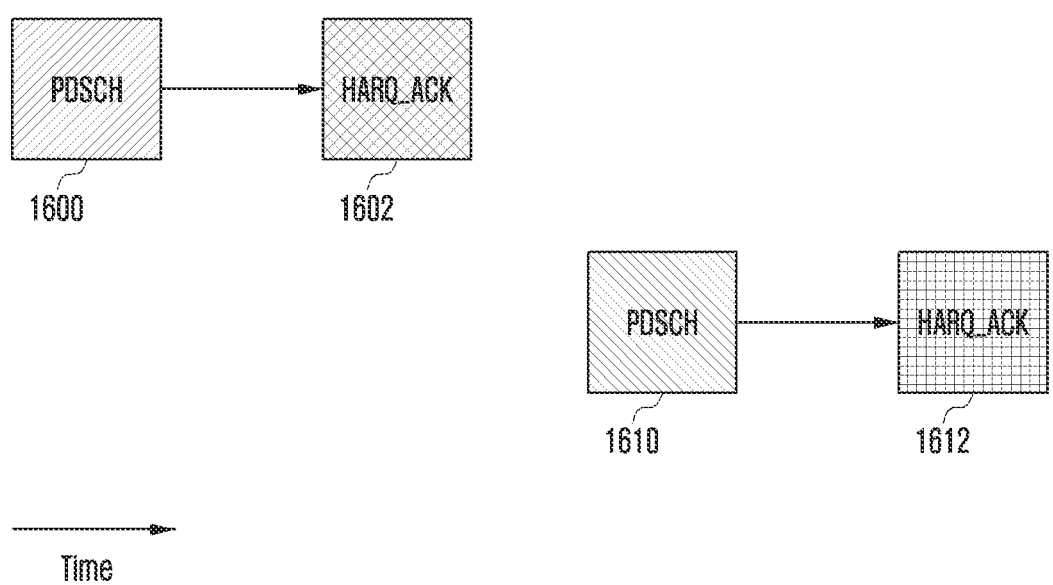
FIG. 16 is a diagram illustrating HARQ-ACK information reporting according to PDSCH scheduling for a specific HARQ process according to an embodiment of the disclosure.

FIG. 16 is a diagram illustrating HARQ-ACK information reporting according to PDSCH scheduling for a specific HARQ process according to an embodiment of the disclosure.

Referring to FIG. 16, the base station transmits a first PDSCH 1600 corresponding to a first HARQ process to a UE, and receives the PUCCH or PUSCH including HARQ-ACK information 1602 for this. Next, the base station transmits a second PDSCH 1610 corresponding to the first HARQ process to the UE and receives the PUCCH or PUSCH including the HARQ-ACK information 1612 for the second PDSCH 1610. In FIG. 16, the first PDSCH and the second PDSCH may include the same transport block (TB) or different TBs, which may be distinguished by the UE by the NDI included in the control information (DCI). Identification of a specific HARQ process corresponding to the first PDSCH is indicated by the HARQ process number field included in the DCI scheduling the first PDSCH, or may be determined according to the period and time at which the corresponding SPS PDSCH is transmitted/received, and the number of HARQ processes in the case of SPS PDSCH transmitted and received without DCI. As an example, the HARQ process may be determined by the following Equation 1.

$$\text{HARQ Process ID} = \left[\text{floor}\left(\text{CURRENT\_slot} \times 10/(\text{numberOfSlotsPerFrame} \times \text{periodicity})\right)\right] \quad \text{Equation 1}$$
$$\text{modulo nrofHARQ-Processes} + \text{harq-ProcID-Offset}$$

In Equation 1, CURRENT_slot is a slot number through which SPS PDSCH is transmitted and received, and numberOfSlotsPerFrame is the total number of slots in one frame (10 ms) and may have different number of slots according to subcarrier spacing. For example, in the case of 15 kHz, there are 10. Periodicity is the transmission/reception period of the corresponding SPS PDSCH. nrofHARQ-Processes is the number of HARQ processes that can be configured in the corresponding SPS PDSCH, and may have a value between 1 and 16. The harq-ProcID-Offset is a HARQ process ID offset value, and may have a value between 0 and 16, and the corresponding parameter itself may not exist.

When the UE receives the first PDSCH 1600 corresponding to the first HARQ process, receives a second PDSCH corresponding to the first HARQ process from the base station before the last symbol of transmitting the PUCCH or PUSCH including the HARQ-ACK information 1602 for the first PDSCH 1600, or receives a PDCCH including a DCI for scheduling a PDSCH, the UE regards this as an error case and may or may not receive the corresponding PDSCH. For this reason, the UE places a separate buffer for each HARQ process number and reports HARQ-ACK information generated after demodulating/decoding individual PDSCHs. This is because, when receiving a PDSCH having the same HARQ process number or a PDCCH scheduling the corresponding PDSCH before reporting the corresponding HARQ-ACK information, a problem may occur in processing the PDSCH being processed in the corresponding buffer. Therefore, when the PDSCHs 1600 and 1610 have the same HARQ process for smooth PDSCH demodulation/decoding and HARQ-ACK report of the UE, the base station must guarantee the scheduling as shown in FIG. 16.

When the PDSCH 1600 is multicast data, and the presence or absence of HARQ-ACK information transmission therefor is determined by the higher signal or the signal L1, PUCCH or PUSCH including actual HARQ-ACK information 1602 for PDSCH 1600 may not exist. In this case, since there is no actual HARQ-ACK information 1602 as shown in FIG. 16, it is difficult for the base station to determine from which time point the UE can receive the PDSCH 1610 for the first HARQ process number or can receive the PDCCH including the DCI for scheduling the PDSCH 1610. Therefore, when there is no actual HARQ-ACK information transmission/reception, it is necessary to define a timing point for scheduling a PDSCH having the same HARQ process, and the base station and the UE can support this through at least one of the following methods.

Method 3-1: Determine by the PDSCH-to-HARQ feedback timing and PUCCH resource indicator included in DCI. In control information (DCI) for scheduling PDSCH, a "PDSCH-to-HARQ feedback timing" field indicating a difference value between a slot in which the PDSCH is transmitted/received and a slot in which HARQ-ACK information is transmitted/received exists. In addition, there is a "PUCCH resource indicator" field that informs the transmission resource (e.g., the start symbol and transmission length of the PUCCH) information of the PUCCH to be transmitted in the slot in which the corresponding HARQ-ACK information is transmitted and received. The two fields can be configured by the higher signal, and when there is no corresponding field, one value configured by the higher signal can be used. At this time, the corresponding base station and the UE are used only as information for determining at which time point the PDSCH can be scheduled again using the same HARQ process described in FIG. 16, and transmission and reception of PUCCH including actual HARQ-ACK information does not occur.

Method 3-1 can be limitedly applied to a case in which HARQ-ACK information for a PDSCH scheduling data for multicast can be indicated by the higher signal to another specific field in DCI whether to transmit HARQ-ACK information. Alternatively, the method 3-1 may be operated by configuring a separate the higher signal. Alternatively, the method 3-1 may be limitedly applied to UEs that have reported a specific UE capability related to the same operation as the method 3-1. For reference, method 3-1 may be a method applicable even when actual HARQ-ACK information transmission occurs through PUCCH or PUSCH. At this time, PUCCH including HARQ-ACK information is determined by PDSCH-to-HARQ feedback timing and PUCCH resource indicator. When a PUCCH including HARQ-ACK information overlaps with another PUSCH, it is determined by additionally considering transmission resources of a PUSCH scheduled in addition to the PUCCH. On the other hand, if there is no actual HARQ-ACK information transmission in method 3-1, since there is no PUCCH resource including actual HARQ-ACK information, the PUSCH transmission resource may not be separately considered.

Method 3-2: Assume that the UE's minimum PDSCH to HARQ processing time (PDSCH processing time) value. When the UE is not instructed to report the HARQ-ACK information by the higher signal or the signal L1, a PDSCH processing time is assumed as a reference timing for considering a time for transmitting/receiving a PDSCH using the same HARQ process number or transmitting/receiving a PDCCH including a DCI for scheduling the PDSCH. For example, the base station and the UE transmit and receive the first PDSCH scheduled with the first HARQ process number up to x symbols, and then transmit and receive the second PDSCH scheduled with the first HARQ process number after x+n symbols. Here, n may be the minimum PDSCH processing time value of the UE.

Specifically, next, a PDSCH processing procedure time will be described. When the base station schedules the UE to transmit the PDSCH using DCI format 1_0, 1_1, or 1_2, the UE may need a PDSCH processing time for receiving the PDSCH by applying the transmission method (modulation/demodulation and coding indication index (MCS), demodulation reference signal related information, time and frequency resource allocation information, etc.) indicated through DCI. In NR, the PDSCH processing time is defined in consideration of this. The PDSCH processing time of the UE may follow Equation 2 below.

$$T_{proc,1} = (N_1 + d_{1,1} + d_2)(2048 + 144) \kappa 2^{-\mu} T_c + T_{ext} \quad \text{Equation 2}$$

Each variable in $T_{proc,1}$ described above with Equation 2 may have the following meaning.

$N_1$: The number of symbols determined according to the UE processing capability 1 or 2 and the numerology u according to the capability of the UE. When reported as UE processing capability 1 according to the capability report of the UE, the value of Table 12 may be obtained. When the fact that it is reported as UE processing capability 2 and that UE processing capability 2 is available is configured through the higher signaling, the value of Table 13 may be obtained. Numerology u may correspond to the minimum value of $\mu_{PDCCH}$, $\mu_{PDSCH}$, $\mu_{UL}$ to maximize the $T_{proc,1}$, and $\mu_{PDCCH}$, $\mu_{PDSCH}$, and $\mu_{UL}$ may refer to the numerology of the PDCCH in which the PDSCH is scheduled, the numerology of the scheduled PDSCH, and the numerology of the uplink channel through which the HARQ-ACK is to be transmitted, respectively.

TABLE 12

PDSCH decoding time $N_1$ [symbols]

| $\mu$ | In case in which both PDSCH mapping type A and B are dmrs-AdditionalPosition = pos0 in DMRS-DownlinkConfig which is higher layer signaling | In case in which both PDSCH mapping type A and B are not dmrs-AdditionalPosition = pos0 in DMRS-DownlinkConfig which is higher layer signaling, or in case in which higher layer parameter is not configured |
|---|---|---|
| 0 | 8 | $N_{1,0}$ |
| 1 | 10 | 13 |
| 2 | 17 | 20 |
| 3 | 20 | 24 |

TABLE 13

PDSCH decoding time $N_1$ [symbols]
In case in which both PDSCH mapping type A and B are dmrs-AdditionalPosition = pos0 in DMRS-DownlinkConfig which is higher layer signaling

| $\mu$ | |
|---|---|
| 0 | 3 |
| 1 | 4.5 |
| 2 | 9 for frequency range 1 |

κ: 64

$T_{ext}$: When the UE uses a shared spectrum channel access method, the UE may calculate Text and apply it to the PDSCH processing time. Otherwise, Text is assumed to be 0.

When $1_1$ indicating the PDSCH DMRS position value is 12, $N_{1,0}$ of Table 12 has a value of 14, otherwise it has a value of 13.

For PDSCH mapping type A, the last symbol of the PDSCH is an i-th symbol in the slot in which the PDSCH is transmitted, and if i<7, $d_{1,1}$ is 7−i, otherwise $d_{1,1}$ is 0.

$d_2$: When a PUCCH having a high priority index and a PUCCH or a PUSCH having a low priority index overlap in time, $d_2$ of the PUCCH having a high priority index may be configured to a value reported by the UE. Otherwise, $d_2$ is 0.

When PDSCH mapping type B is used for UE processing capability 1, the value of $d_{1,1}$ may be determined according to the number d of overlapping symbols between L, which is the number of symbols of the scheduled PDSCH, and the PDCCH, which schedules the PDSCH, and the scheduled PDSCH, as follows.

When L≥7, $d_{1,1}=0$
When L≥4 and L≤6, $d_{1,1}=7-L$
When L=3, $d_{1,1}=\min(d, 1)$
When L=2, $d_{1,1}=3+d$ When PDSCH mapping type B is used for UE processing capability 2, the $d_{1,1}$ value may be determined according to the number d of overlapping symbols between L, which is the number of symbols of the scheduled PDSCH, and the PDCCH scheduling the PDSCH and the scheduled PDSCH as follows.

When L≥7, $d_{1,1}=0$
When L≥4 and L≤6, $d_{1,1}=7-L$
When L=2, in case where PDCCH to be scheduled exists in CORESET composed of three symbols and corresponding CORESET and scheduled PDSCH have the same starting symbol, $d_{1,1}=3$. Otherwise, $d_{1,1}=d$.

For the UE supporting capability 2 in a given serving cell, the PDSCH processing time according to UE processing capability 2 may be applied when the UE configures processing Type2Enabled, which is higher layer signaling, to enable for the cell.

When the position (the corresponding position can be considered K1, which is defined as the transmission time of HARQ-ACK, PUCCH resource used for HARQ-ACK transmission, and the effect of timing advance) of the first uplink transmission symbol of the PUCCH including the HARQ-ACK information does not start earlier than the first uplink transmission symbol that appears after a time of $T_{proc,1}$ from the last symbol of the PDSCH, the UE must transmit a valid HARQ-ACK message. That is, the UE should transmit the PUCCH including the HARQ-ACK only when the PDSCH processing time is sufficient. Otherwise, the UE cannot provide the base station with valid HARQ-ACK information corresponding to the scheduled PDSCH. The $T_{proc,1}$ may be used for both normal or extended CP. When the PDSCH consists of two PDSCH transmission positions in one slot, $d_{1,1}$ is calculated based on the first PDSCH transmission position in the corresponding slot. When Equation 2 is described with reference to FIG. 16, the minimum time interval between the first PDSCH 16800 and the second PDSCH 16810 should be $T_{proc,1}$.

Method 3-2 can be limitedly applied to a case in which it is configured to indicate through a specific field of the DCI format so as to dynamically determine whether multicast HARQ-ACK information is transmitted with an upper signal, and a case in which it is instructed that there is no transmission of the corresponding HARQ-ACK information through a specific field of the DCI format. Alternatively, the method 3-2 may be applied only to a case in which it is configured that no multicast HARQ-ACK information transmission is received as the higher signal. Alternatively, the method 3-2 may be set by a separate higher signal. Alternatively, the method 3-2 may be limitedly applied to UEs reporting a specific UE capability.

Method 3-3 uses the reference value configured as the higher signal. According to the method, unlike methods 3-1 to 3-2, it may be possible for the base station to configure in advance a reference time for transmitting and receiving a PDSCH having the same HARQ process number to the UE or for transmitting and receiving a PDCCH including a DCI for scheduling a PDSCH as the higher signal. Taking FIG. 16 as an example, when the minimum time interval between the first PDSCH 1600 and the second PDSCH 1610 is b symbols, the corresponding value b is a value previously configured as the higher signal. Alternatively, the value b may correspond to a value that is at least one of the possible values by the UE capability report before the higher configuration.

Figure 17:
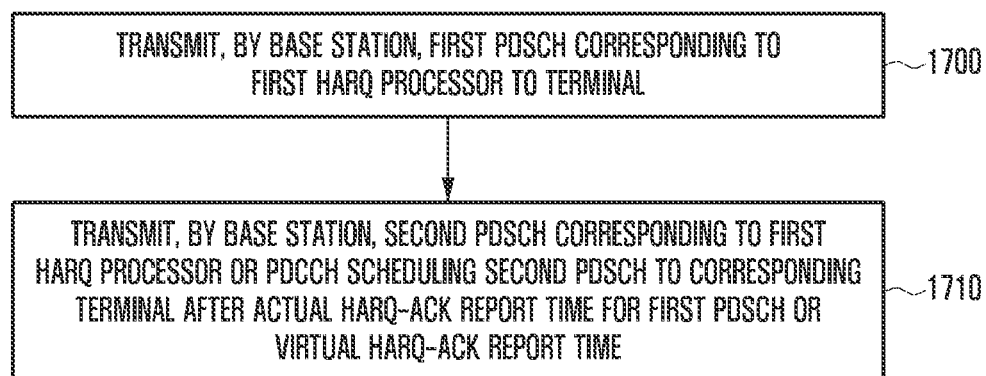
FIG. 17 is a flowchart illustrating an operation process of a base station for performing scheduling in consideration of the same HARQ process according to an embodiment of the disclosure.

FIG. 17 is a flowchart illustrating an operation process of a base station for performing scheduling in consideration of the same HARQ process according to an embodiment of the disclosure.

Referring to FIG. 17, the base station transmits a first PDSCH corresponding to the first HARQ process number to a UE in 1700. Next, the base station considers at least one of methods 3-1 to 3-3 or a combination of at least one of the methods 3-1 to 3-3 in order to determine a condition for scheduling another PDSCH corresponding to the first HARQ process number used in the first PDSCH. For example, after the first PDSCH transmission, according to the last symbol of a resource in which actual HARQ-ACK information is received according to method 3-1 or at least one of methods 3-1 to 3-3, although there is no actual reception of HARQ-ACK information, the base station transmits a second PDSCH corresponding to a first HARQ process number or the PDCCH for scheduling the second PDSCH after the time of receiving the preset virtual HARQ-ACK report to the corresponding terminal can be scheduled and transmitted in 1710. When the base station schedules the second PDSCH or the PDCCH for scheduling the second PDSCH to the corresponding terminal before the time point, it may be possible that the UE performs an arbitrary operation by considering it as an error case, or that the UE does not receive the second PDSCH or the PDCCH for scheduling the second PDSCH. Therefore, even if the base station transmits the second PDSCH or the PDCCH for scheduling the second PDSCH to the UE, it cannot predict which information of the UE has been received.

Although FIG. 17 has been described from the viewpoint of operation of the base station, it is sufficiently possible to consider it as operation from the viewpoint of the UE. The UE receives the first PDSCH corresponding to the first HARQ process number from the base station in 1700. Next, the UE considers at least one of methods 3-1 to 3-3 or a combination of at least one of methods 3-1 to 3-3 in order to determine a condition for scheduling another PDSCH corresponding to the first HARQ process number used in the first PDSCH. For example, after the first PDSCH transmission, according to the last symbol of a resource in which actual HARQ-ACK information is received according to method 3-1 or at least one of methods 3-1 to 3-3, although there is no actual reception of HARQ-ACK information, the UE receives the second PDSCH corresponding to the first HARQ process number or the PDCCH for scheduling the second PDSCH from the corresponding base station after the time of receiving the preset virtual HARQ-ACK report (1710). When the base station transmits the second PDSCH or the PDCCH scheduling the second PDSCH to the UE before the time point, the UE may be regarded as an error case, and may perform any operation based on the received second PDSCH or PDCCH or may not consider the received information. Alternatively, the UE may stop the reception operation of the first PDSCH and may not perform HARQ-ACK information transmission corresponding thereto.

Figure 18:
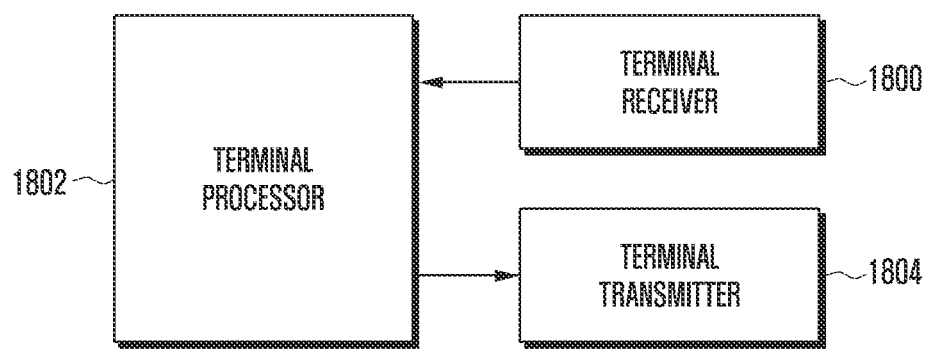
FIG. 18 is a block diagram illustrating a structure of a UE capable of performing according to an embodiment of the disclosure.

FIG. 18 is a block diagram illustrating a structure of a UE capable of performing according to an embodiment of the disclosure.

Referring to FIG. 18, the UE of the disclosure may include a terminal receiver 1800, a terminal transmitter 1804, and a terminal processor 1802. The terminal receiver 1800 and the terminal transmitter 1804 may be collectively referred to as a transceiver in the embodiment. The transceiver may transmit/receive a signal to/from the base station. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel, output the received signal to the terminal processor 1802, and transmit a signal output from the terminal processor 1802 through a wireless channel. The terminal processor 1802 may control a series of processes so that the UE may operate according to the above-described embodiment.

Figure 19:
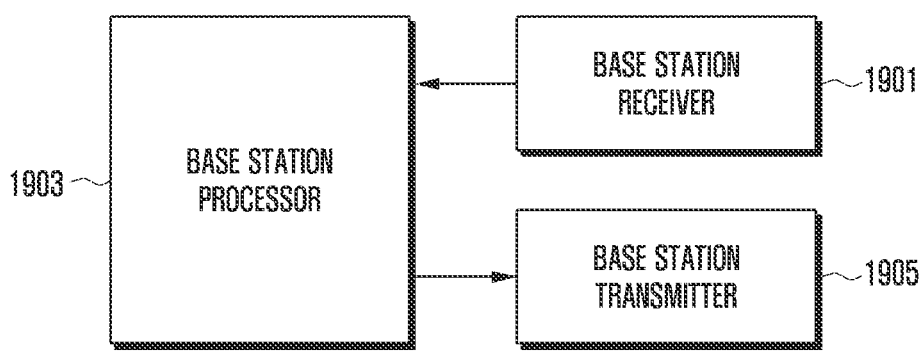
FIG. 19 is a block diagram illustrating a structure of a base station capable of performing according to an embodiment of the disclosure.

FIG. 19 is a block diagram illustrating a structure of a base station capable of performing according to an embodiment of the disclosure.

Referring to FIG. 19, in the embodiment, the base station may include at least one of a base station receiver 1901, a base station transmitter 1905, and a base station processor 1903. The base station receiver 1901 and the base station transmitter 1905 may be collectively referred to as a transceiver in the embodiment of the disclosure. The transceiver may transmit/receive a signal to/from the UE. The signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel and output the received signal to the base station processor 1903, and transmit the signal output from the terminal processor 1903 through a wireless channel. The base station processing unit 1903 may control a series of processes so that the base station can operate according to the above-described embodiment of the disclosure.

In the drawings in which methods of the disclosure are described, the order of the description does not always correspond to the order in which steps of each method are performed, and the order relationship between the steps may be changed or the steps may be performed in parallel. Alternatively, in the drawings in which methods of the disclosure are described, some elements may be omitted and only some elements may be included therein without departing from the essential spirit and scope of the disclosure.

Although the disclosure has mainly described the UE operation for the SPS PDSCH, it may be sufficiently applicable to equally apply to the grant-free PUSCH (or configured grant type 1 and type 2).

Further, in methods of the disclosure, some or all of the contents of each embodiment may be combined without departing from the essential spirit and scope of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, several embodiments of the disclosure may be partially combined to operate a base station and a terminal. Further, although the above embodiments have been described on the basis of the NR system, other variants based on the technical idea of the embodiments may be implemented in other systems such as FDD or time division duplex (TDD) LTE systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a base station, configuration information on a semi-persistent scheduling (SPS) for a multicast;
   receiving, from the base station, information indicating a feedback scheme for the SPS for the multicast via higher layer signaling;
   in case that first downlink control information (DCI) for activating the SPS is received from the base station, receiving, from the base station, a first SPS physical downlink shared channel (PDSCH) after an activation of the SPS based on the configuration information and the first DCI;
   identifying hybrid automatic repeat request acknowledgement (HARQ-ACK) information corresponding to the first SPS PDSCH according to a first feedback scheme;
   receiving, from the base station, a second SPS PDSCH; and
   identifying whether to transmit HARQ-ACK information corresponding to the second SPS PDSCH according to the feedback scheme indicated by the information,
   wherein the first feedback scheme is a feedback type that a terminal generates ACK or NACK as HARQ-ACK information.

2. The method of claim 1,
   wherein the feedback scheme indicated by the information is one of the first feedback scheme or a second feedback scheme, and
   wherein the second feedback scheme is a feedback type that a terminal generates only NACK as HARQ-ACK information.

3. The method of claim 1, further comprising:
   receiving, from the base station, second DCI for an SPS release; and
   identifying HARQ-ACK information corresponding to the second DCI according to the first feedback scheme.

4. The method of claim 1, wherein the first DCI is scrambled by a radio network temporary identifier (RNTI) for the multicast.

5. A method performed by a base station in a communication system, the method comprising:
- transmitting, to a terminal, configuration information on a semi-persistent scheduling (SPS) for a multicast;
- transmitting, to the terminal, information indicating a feedback scheme for the SPS for the multicast via higher layer signaling;
- transmitting, to the terminal, first downlink control information (DCI) for activating the SPS;
- transmitting, to the terminal, a first SPS physical downlink shared channel (PDSCH) after an activation of the SPS corresponding to the configuration information and the first DCI;
- receiving, from the terminal, hybrid automatic repeat request acknowledgement (HARQ-ACK) information corresponding to the first SPS PDSCH associated with a first feedback scheme;
- transmitting, to the terminal, a second SPS PDSCH; and
- identifying whether HARQ-ACK information corresponding to the second SPS PDSCH associated with the feedback scheme is received,
- wherein the first feedback scheme is a feedback type that a terminal generates ACK or NACK as HARQ-ACK information.

6. The method of claim 5,
- wherein the feedback scheme indicated by the information is one of the first feedback scheme or a second feedback scheme, and
- wherein the second feedback scheme is a feedback type that a terminal generates only NACK as HARQ-ACK information.

7. The method of claim 5, further comprising:
- transmitting, to the terminal, second DCI for an SPS release; and
- receiving, from the terminal, HARQ-ACK information corresponding to the second DCI according to the first feedback scheme.

8. The method of claim 5, wherein the first DCI is scrambled by a radio network temporary identifier (RNTI) for the multicast.

9. A terminal in a communication system, the terminal comprising:
- transceivers; and
- a controller coupled with the transceivers and configured to:
  - receive, from a base station, configuration information on a semi-persistent scheduling (SPS) for a multicast,
  - receive, from the base station, information indicating a feedback scheme for the SPS for the multicast via higher layer signaling,
  - in case that first downlink control information (DCI) for activating the SPS is received from the base station, receive, from the base station, a first SPS physical downlink shared channel (PDSCH) after an activation of the SPS based on the configuration information and the first DCI,
  - identify hybrid automatic repeat request acknowledgement (HARQ-ACK) information corresponding to the first SPS PDSCH according to a first feedback scheme,
  - receive, from the base station, a second SPS PDSCH, and
  - identify whether to transmit HARQ-ACK information corresponding to the second SPS PDSCH according to the feedback scheme indicated by the information,
- wherein the first feedback scheme is a feedback type that a terminal generates ACK or NACK as HARQ-ACK information.

10. The terminal of claim 9,
- wherein the feedback scheme indicated by the information is one of the first feedback scheme or a second feedback scheme, and
- wherein the second feedback scheme is a feedback type that a terminal generates only NACK as HARQ-ACK information.

11. The terminal of claim 9, wherein the controller is further configured to:
- receive, from the base station, second DCI for an SPS release, and
- identify HARQ-ACK information corresponding to the second DCI according to the first feedback scheme.

12. The terminal of claim 9, wherein the first DCI is scrambled by a radio network temporary identifier (RNTI) for the multicast.

13. A base station in a communication system, the base station comprising:
- transceivers; and
- a controller coupled with the transceivers and configured to:
  - transmit, to a terminal, configuration information on a semi-persistent scheduling (SPS) for a multicast,
  - transmit, to the terminal, information indicating a feedback scheme for the SPS for the multicast via higher layer signaling,
  - transmit, to the terminal, first downlink control information (DCI) for activating the SPS,
  - transmit, to the terminal, a first SPS physical downlink shared channel (PDSCH) after an activation of the SPS corresponding to the configuration information and the first DCI,
  - receive, from the terminal, hybrid automatic repeat request acknowledgement (HARQ-ACK) information corresponding to the first SPS PDSCH associated with a first feedback scheme,
  - transmit, to the terminal, a second SPS PDSCH, and
  - identify whether HARQ-ACK information corresponding to the second SPS PDSCH associated with the feedback scheme is received,
- wherein the first feedback scheme is a feedback type that a terminal generates ACK or NACK as HARQ-ACK information.

14. The base station of claim 13,
- wherein the feedback scheme indicated by the information is one of the first feedback scheme or a second feedback scheme, and
- wherein the second feedback scheme is a feedback type that a terminal generates only NACK as HARQ-ACK information.

15. The base station of claim 13, wherein the controller is further configured to:
- transmit, to the terminal, second DCI for an SPS release, and
- receive, from the terminal, HARQ-ACK information corresponding to the second DCI according to the first feedback scheme.

16. The base station of claim 13, wherein the first DCI is scrambled by a radio network temporary identifier (RNTI) for the multicast.

* * * * *